US012803762B2

(12) United States Patent
Leng et al.

(10) Patent No.: US 12,803,762 B2
(45) Date of Patent: Nov. 17, 2026

(54) MAC CONTROL ELEMENT FOR MULTI-TRANSMISSION/RECEPTION POINT OPERATION

(71) Applicant: Samsung Electronics Co., Ltd., Suwon-si (KR)

(72) Inventors: Shiyang Leng, Allen, TX (US); Anil Agiwal, Allen, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 18/611,588

(22) Filed: Mar. 20, 2024

(65) Prior Publication Data

US 2024/0322984 A1 Sep. 26, 2024

Related U.S. Application Data

(60) Provisional application No. 63/598,245, filed on Nov. 13, 2023, provisional application No. 63/547,072, (Continued)

(51) Int. Cl.

*H04W 72/231* (2023.01)
*H04L 5/00* (2006.01)

(52) U.S. Cl.

CPC .......... *H04L 5/0091* (2013.01); *H04L 5/0035* (2013.01); *H04L 5/0053* (2013.01)

(58) Field of Classification Search

CPC ... H04L 5/0091; H04L 5/0035; H04L 5/0053; H04L 5/0094; H04W 80/02;

(Continued)

(56) References Cited

U.S. PATENT DOCUMENTS

2020/0359459 A1 11/2020 Kakishima et al.
2022/0061069 A1* 2/2022 Yang .................. H04W 72/232

(Continued)

FOREIGN PATENT DOCUMENTS

WO 2021215818 A1 10/2021

OTHER PUBLICATIONS

"5G; NR; NR and NG-RAN Overall description; Stage-2 (3GPP TS 38.300 version 17.5.0 Release 17)", ETSI TS 138 300 V17.5.0, Jul. 2023, 214 pages.

(Continued)

*Primary Examiner* — Thai Nguyen

(57) ABSTRACT

Methods and apparatuses for a MAC CE for multi-TRP operation in a wireless communication system. A method of a UE comprises: receiving, from a BS belonging to a serving cell, a first MAC PDU including a first MAC subheader with a first eLCID and a first MAC CE; identifying, based on the first eLCID, an enhanced unified TCI states activation/deactivation MAC CE for joint TCI states or separate TCI states including a bitmap of TCI state ID presence indications and TCI state IDs, wherein a bit in the bitmap of TCI state ID presence indications indicates, for the TCI state IDs associated with a codepoint of a DCI TCI field, whether a TCI state for a TRP is present in a corresponding MAC CE, and a maximum number of the TCI state IDs that are activated is 32; and indicating, to lower layers, information associated with the corresponding MAC CE.

20 Claims, 11 Drawing Sheets

Related U.S. Application Data filed on Nov. 2, 2023, provisional application No. 63/540,286, filed on Sep. 25, 2023, provisional application No. 63/539,946, filed on Sep. 22, 2023, provisional application No. 63/467,749, filed on May 19, 2023, provisional application No. 63/465,449, filed on May 10, 2023, provisional application No. 63/454,559, filed on Mar. 24, 2023.

(58) Field of Classification Search
CPC ............ H04W 72/231; H04W 72/0457; H04B 7/0404; H04B 7/0695
See application file for complete search history.

(56) References Cited

U.S. PATENT DOCUMENTS

| | | | | |
|---|---|---|---|---|
| 2022/0394548 | A1 | 12/2022 | Huang et al. | |
| 2023/0034163 | A1* | 2/2023 | Kim | H04W 76/30 |
| 2023/0292335 | A1* | 9/2023 | Park | H04W 72/231 |

OTHER PUBLICATIONS

"5G; NR; Radio Resource Control (RRC); Protocol specification (3GPP TS 38.331 version 17.5.0 Release 17)", ETSI TS 138 331 V17.5.0, Jul. 2023, 1304 pages.
"5G; NR; Medium Access Control (MAC) protocol specification (3GPP TS 38.321 version 17.5.0 Release 17)", ETSI TS 138 321 V17.5.0, Jul. 2023, 255 pages.
International Search Report and Written Opinion issued Jun. 14, 2024 regarding International Application No. PCT/KR2024/003651, 8 pages.
"3rd Generation Partnership Project; Technical Specification Group Radio Access Network; NR; Medium Access Control (MAC) protocol specification (Release 17)", 3GPP TS 38.321 V17.3.0, Dec. 2022, 251 pages.
Supplementary European Search Report dated May 12, 2026, in connection with European Patent Application No. 24781141.7, 10 pages.
Samsung, "Summary of MAC (Samsung)," R2-2204056, 3GPP TSG-RAN WG2 #117, Online, Feb. 21-Mar. 3, 2022, 63 pages.

* cited by examiner

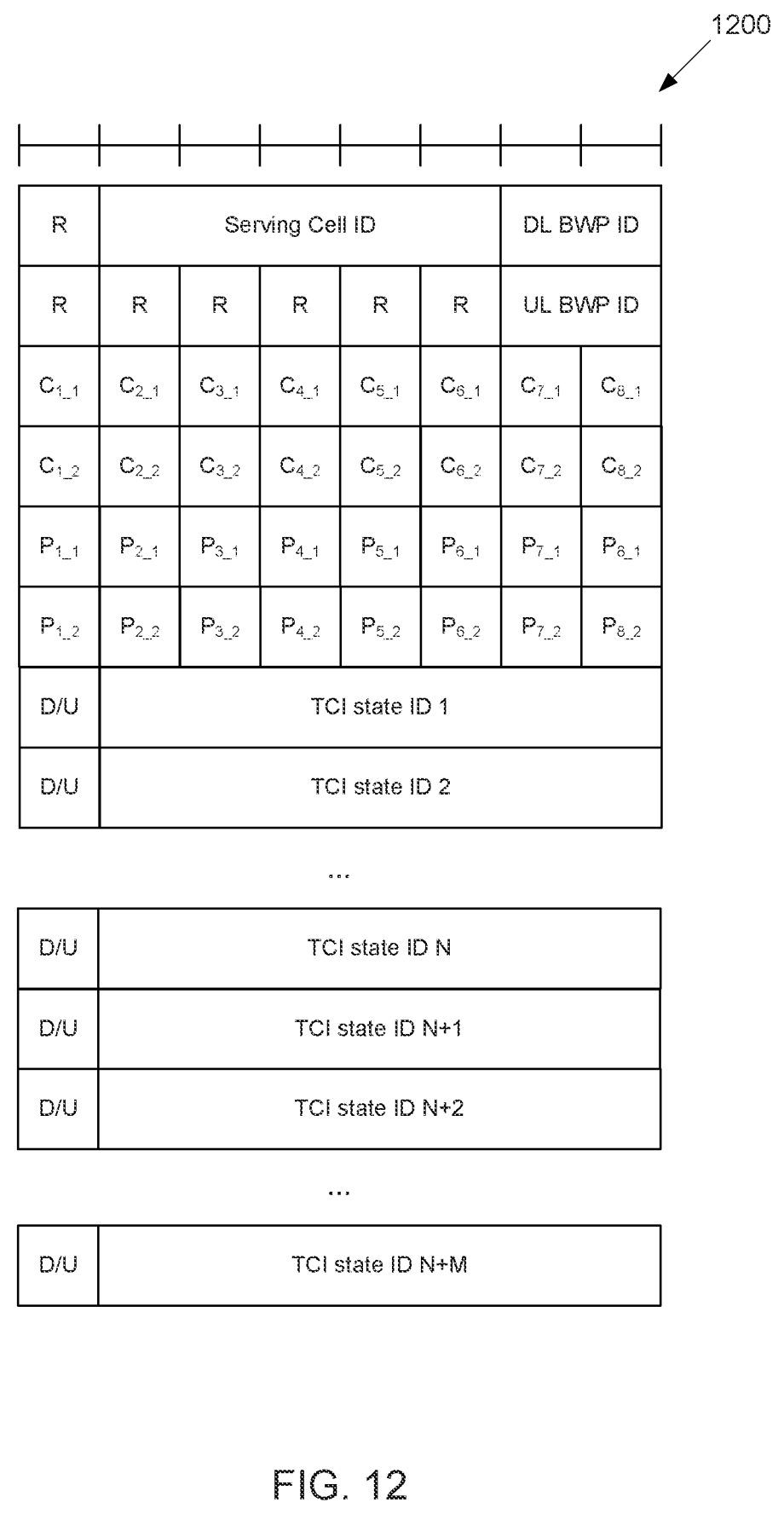

1200

| | | | | | | | |
|---|---|---|---|---|---|---|---|
| R | Serving Cell ID | | | | | DL BWP ID | |
| R | R | R | R | R | R | UL BWP ID | |
| $C_{1\_1}$ | $C_{2\_1}$ | $C_{3\_1}$ | $C_{4\_1}$ | $C_{5\_1}$ | $C_{6\_1}$ | $C_{7\_1}$ | $C_{8\_1}$ |
| $C_{1\_2}$ | $C_{2\_2}$ | $C_{3\_2}$ | $C_{4\_2}$ | $C_{5\_2}$ | $C_{6\_2}$ | $C_{7\_2}$ | $C_{8\_2}$ |
| $P_{1\_1}$ | $P_{2\_1}$ | $P_{3\_1}$ | $P_{4\_1}$ | $P_{5\_1}$ | $P_{6\_1}$ | $P_{7\_1}$ | $P_{8\_1}$ |
| $P_{1\_2}$ | $P_{2\_2}$ | $P_{3\_2}$ | $P_{4\_2}$ | $P_{5\_2}$ | $P_{6\_2}$ | $P_{7\_2}$ | $P_{8\_2}$ |
| D/U | TCI state ID 1 | | | | | | |
| D/U | TCI state ID 2 | | | | | | |

...

| | |
|---|---|
| D/U | TCI state ID N |
| D/U | TCI state ID N+1 |
| D/U | TCI state ID N+2 |

...

| | |
|---|---|
| D/U | TCI state ID N+M |

FIG. 12

1300

| | | | | | | | |
|---|---|---|---|---|---|---|---|
| M/S | Serving Cell ID | | | | | DL BWP ID | |
| CORESET Pool ID | R | R | R | R | R | UL BWP ID | |
| $C_{1\_1}$ | $C_{2\_1}$ | $C_{3\_1}$ | $C_{4\_1}$ | $C_{5\_1}$ | $C_{6\_1}$ | $C_{7\_1}$ | $C_{8\_1}$ |
| $C_{1\_2}$ | $C_{2\_2}$ | $C_{3\_2}$ | $C_{4\_2}$ | $C_{5\_2}$ | $C_{6\_2}$ | $C_{7\_2}$ | $C_{8\_2}$ |
| $P_{1\_1}$ | $P_{2\_1}$ | $P_{3\_1}$ | $P_{4\_1}$ | $P_{5\_1}$ | $P_{6\_1}$ | $P_{7\_1}$ | $P_{8\_1}$ |
| $P_{1\_2}$ | $P_{2\_2}$ | $P_{3\_2}$ | $P_{4\_2}$ | $P_{5\_2}$ | $P_{6\_2}$ | $P_{7\_2}$ | $P_{8\_2}$ |
| D/U | TCI state ID 1 | | | | | | |
| D/U | TCI state ID 2 | | | | | | |

...

| | |
|---|---|
| D/U | TCI state ID N |
| D/U | TCI state ID N+1 |
| D/U | TCI state ID N+2 |

...

| | |
|---|---|
| D/U | TCI state ID N+M |

FIG. 13

1400

| | | | | | | | |
|---|---|---|---|---|---|---|---|
| R | Serving Cell ID | | | | | DL BWP ID | |
| R | R | R | R | R | R | UL BWP ID | |
| $C_{1\_1}$ | $C_{2\_1}$ | $C_{3\_1}$ | $C_{4\_1}$ | $C_{5\_1}$ | $C_{6\_1}$ | $C_{7\_1}$ | $C_{8\_1}$ |
| $C_{1\_2}$ | $C_{2\_2}$ | $C_{3\_2}$ | $C_{4\_2}$ | $C_{5\_2}$ | $C_{6\_2}$ | $C_{7\_2}$ | $C_{8\_2}$ |
| $P_{1\_1}$ | $P_{2\_1}$ | $P_{3\_1}$ | $P_{4\_1}$ | $P_{5\_1}$ | $P_{6\_1}$ | $P_{7\_1}$ | $P_{8\_1}$ |
| $P_{1\_2}$ | $P_{2\_2}$ | $P_{3\_2}$ | $P_{4\_2}$ | $P_{5\_2}$ | $P_{6\_2}$ | $P_{7\_2}$ | $P_{8\_2}$ |
| D/U | TCI state ID 1 | | | | | | |
| D/U | TCI state ID 2 | | | | | | |

...

| | |
|---|---|
| D/U | TCI state ID N |
| D/U | TCI state ID N+1 |
| D/U | TCI state ID N+2 |

...

| | |
|---|---|
| D/U | TCI state ID N+M |

FIG. 14

MAC CONTROL ELEMENT FOR MULTI-TRANSMISSION/RECEPTION POINT OPERATION

CROSS-REFERENCE TO RELATED APPLICATIONS AND CLAIM OF PRIORITY

The present application claims priority to:

U.S. Provisional Patent Application No. 63/454,559, filed on Mar. 24, 2023;

U.S. Provisional Patent Application No. 63/465,449, filed on May 10, 2023;

U.S. Provisional Patent Application No. 63/467,749, filed on May 19, 2023;

U.S. Provisional Patent Application No. 63/539,946, filed on Sep. 22, 2023;

U.S. Provisional Patent Application No. 63/540,286, filed on Sep. 25, 2023;

U.S. Provisional Patent Application No. 63/547,072, filed on Nov. 2, 2023; and

U.S. Provisional Patent Application No. 63/598,245, filed on Nov. 13, 2023.

The contents of the above-identified patent documents are incorporated herein by reference.

TECHNICAL FIELD

The present disclosure relates generally to wireless communication systems and, more specifically, the present disclosure relates to medium access control (MAC) control element (CE) for multi-transmission/reception point (TRP) operation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to MAC CE for multi-TRP operation in a wireless communication system.

In one embodiment, a user equipment (UE) in a wireless communication system is provided. The UE comprises a transceiver configured to receive, from a base station (BS) belonging to a serving cell, a first medium access control protocol data unit (MAC PDU) including a first MAC subheader with a first enhanced logical channel identifier (eLCID) and a first MAC CE. The UE further comprises a processor operably coupled with the transceiver, the processor configured to: identify, based on the first eLCID, an enhanced unified TCI states activation/deactivation MAC CE for joint TCI states or separate TCI states including a bitmap of transmission configuration indicator (TCI) state identifier (ID) presence indications and TCI state IDs, wherein a bit in the bitmap of TCI state ID presence indications indicates, for the TCI state IDs associated with a codepoint of a downlink control information (DCI) TCI field, whether a TCI state for a TRP is present in a corresponding MAC CE, and wherein a maximum number of the TCI state IDs that are activated is 32, and indicate, to lower layers, information associated with the corresponding MAC CE.

In another embodiment, a method of a UE in a wireless communication system is provided. The method comprises: receiving, from a BS belonging to a serving cell, a first MAC PDU including a first MAC subheader with a first enhanced eLCID and a first MAC CE; identifying, based on the first eLCID, an enhanced unified TCI states activation/deactivation MAC CE for joint TCI states or separate TCI states including a bitmap of TCI state ID presence indications and TCI state IDs, wherein a bit in the bitmap of TCI state ID presence indications indicates, for the TCI state IDs associated with a codepoint of a DCI TCI field, whether a TCI state for a TRP is present in a corresponding MAC CE, and wherein a maximum number of the TCI state IDs that are activated is 32; and indicating, to lower layers, information associated with the corresponding MAC CE.

In yet another embodiment, a BS in a wireless communication system is provided. The BS comprises a processor configured to generate a first MAC PDU including a first MAC subheader with a first eLCID and a first MAC CE. The BS further comprises a transceiver operably coupled to the processor, the transceiver configured to transmit, to a UE, the first MAC PDU including the first MAC subheader with the first eLCID and the first MAC CE, wherein the BS belongs to a serving cell, wherein an enhanced unified TCI states activation/deactivation MAC CE for joint TCI states or separate TCI states including a bitmap of TCI state ID presence indications and TCI state IDs is identified based on the first eLCID, wherein a bit in the bitmap of TCI state ID presence indications indicates, for the TCI state IDs associated with a codepoint of a DCI TCI field, whether a TCI state for a TRP is present in a corresponding MAC CE, wherein a maximum number of the TCI state IDs that are activated is 32, and wherein information associated with the corresponding MAC CE is indicated to lower layer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6-14 illustrate examples of unified TCI states activation/deactivation MAC CE according to embodiments of the present disclosure.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: "3GPP, TS 38.300 v17.5.0, 5G; NR; NR and NG-RAN Overall Description; Stage 2"; "3GPP, TS 38.331 v17.5.0, 5G; NR; Radio Resource Control (RRC); Protocol specification"; and "3GPP, TS 38.321 v17.5.0, NR; Medium Access Control (MAC) protocol specification."

Figure 1:
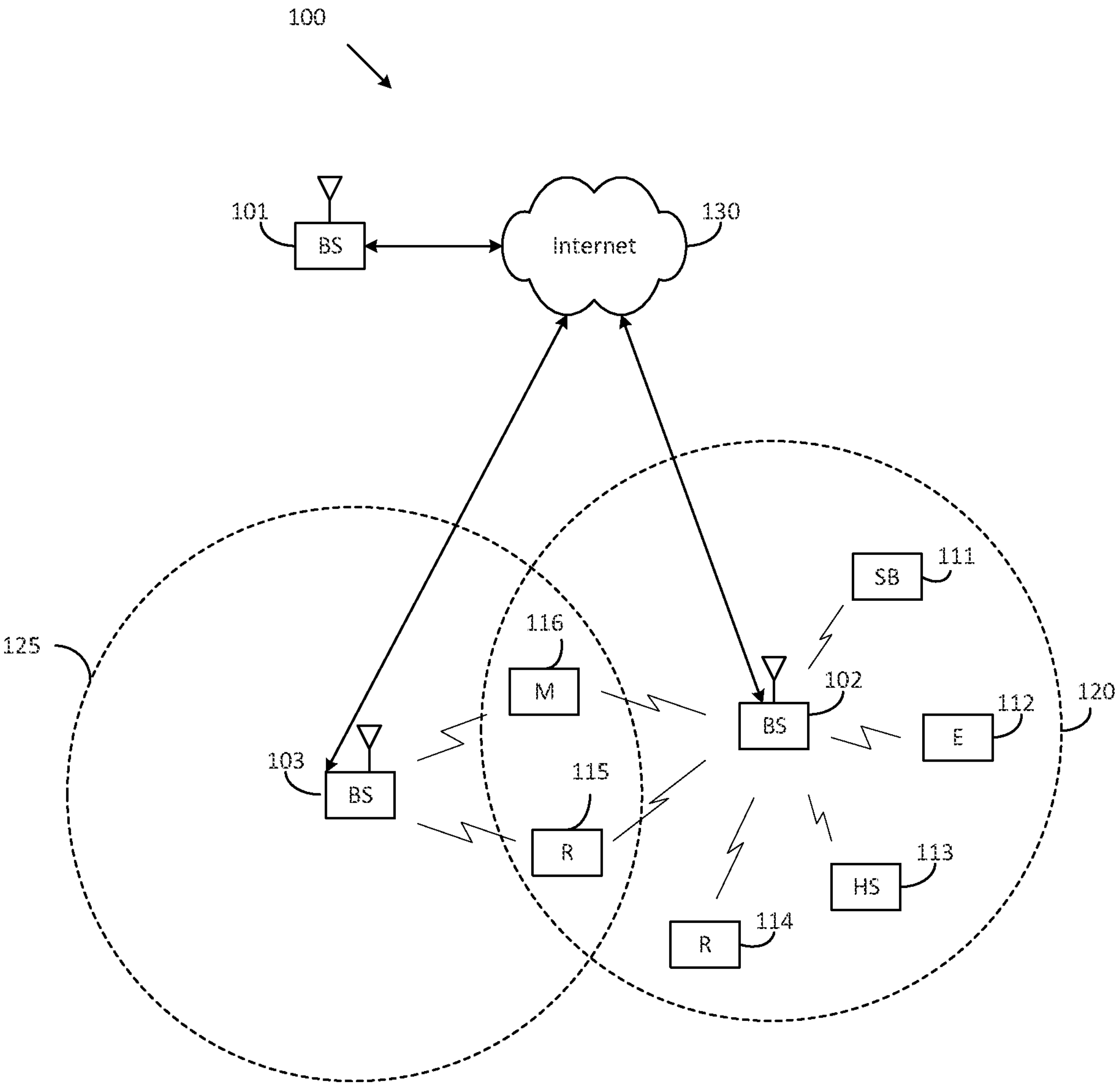
FIG. 1 illustrates an example of wireless network according to embodiments of the present disclosure.
Figure 2:
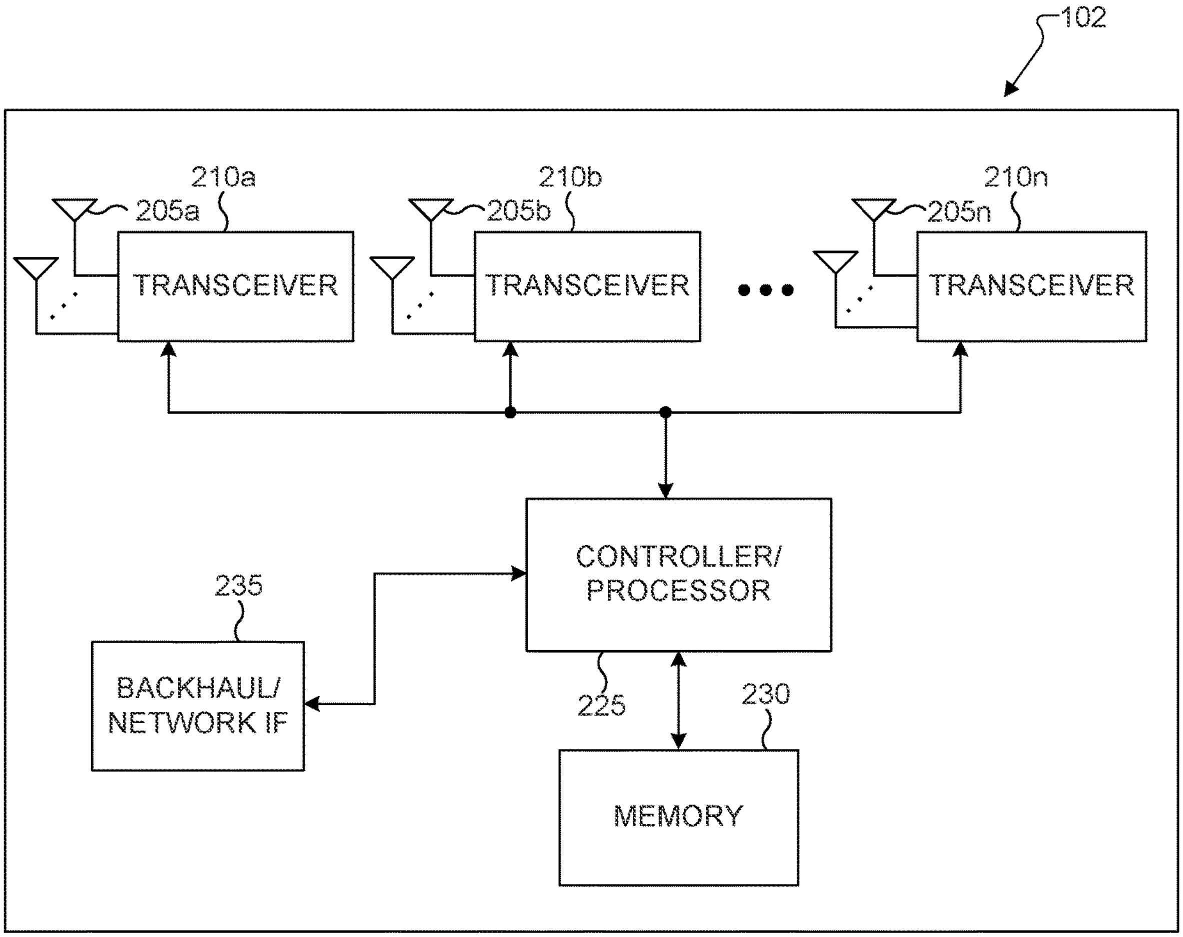
FIG. 2 illustrates an example of gNB according to embodiments of the present disclosure.
Figure 3:
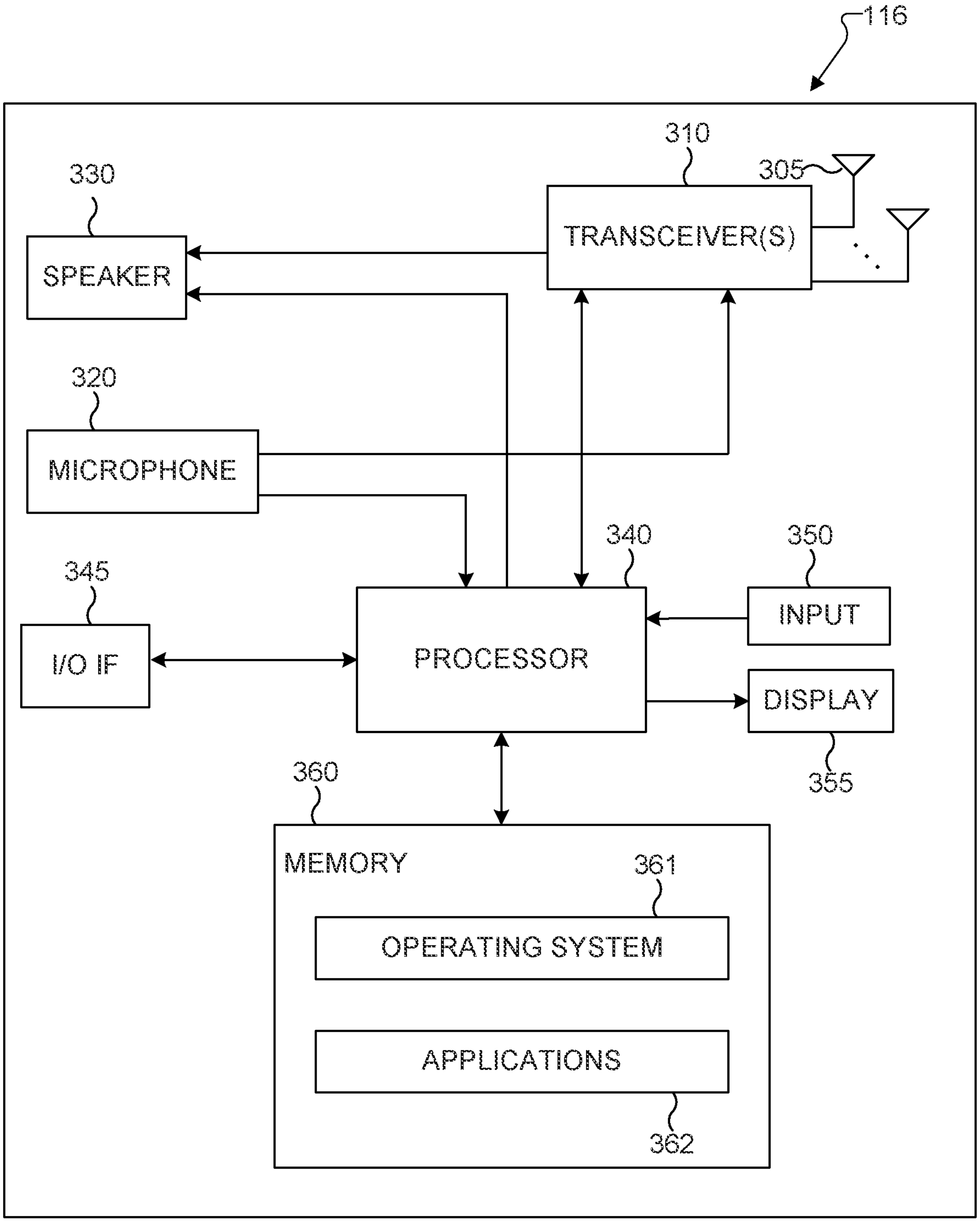
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for supporting a MAC CE for multi-TRP operation in a wireless communication system. In certain embodiments, and one or more of the gNBs 101-103 includes circuitry, programing, or a combination thereof, for supporting a MAC CE for multi-TRP operation in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for supporting a MAC CE for multi-TRP operation in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a MAC CE for multi-TRP operation in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
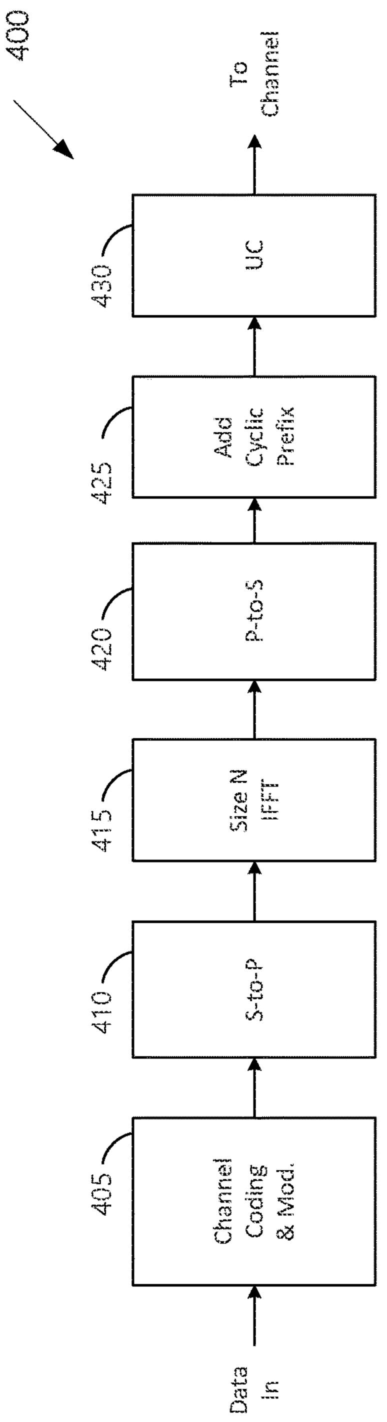
FIGS. 4 and 5 illustrate examples of wireless transmit and receive paths according to this disclosure.
Figure 5:
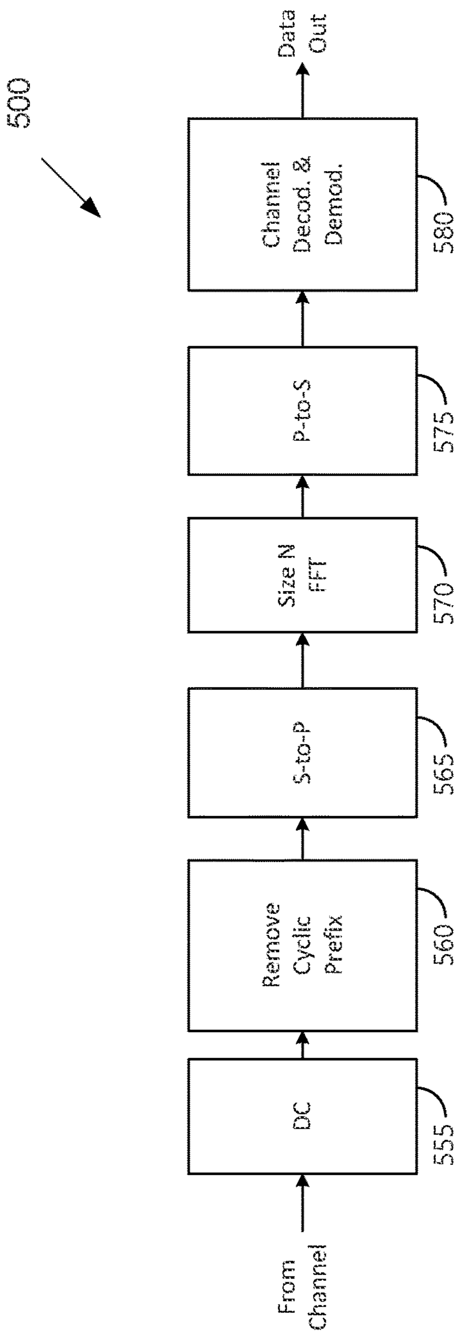

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support a MAC CE for multi-TRP operation in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G new radio (NR). Multiple-input multiple-output (MIMO) is one of the key technologies in NR systems and shows its success in commercial deployment. In multiple TRP (multi-TRP) operation, a serving cell can schedule the UE from two TRPs to provide better coverage, reliability and data rates for downlink and uplink transmission/receptions. Two operation modes are supported to schedule multi-TRP transmission: single-DCI for which the UE is scheduled by the same DCI for both TRPs and multi-DCI where the UE is scheduled by independent DCIs from each TRP.

In Release-17, unified transmission configuration indication (TCI) framework is supported to indicate unified TCI states for DL/UL transmission and reception.

In Release-17, the unified TCI states activation/deactivation MAC CE is introduced to be used for unified TCI states activation and deactivation. The unified TCI framework is desired to be applied to multi-TRP operation. Enhancements to the MAC CE are desired to support unified TCI states activation and deactivation for multi-TRP operation.

In Rel-17, an inter-cell multi-TRP operation is introduced, where one TRP is from the serving cell and the other TRP can from a cell with PCI other than the serving cell, i.e., a non-serving cell, without the change of serving cell. For downlink multi-DCI transmission, one or more TCI states can be associated with SSB from the non-serving cell. The activated TCI states can be associated with at most one non-serving cell at a time. For uplink transmission, the UE transmits the same contents towards two TRPs with corresponding beam directions associated with different spatial relations.

In Release-18 NTN enhancement, satellite without PCI change is considered for which beam-level mobility is required without L3 mobility. However, when switching to a target satellite, the UE needs to perform UL synchronization by random access procedure or by RACH-less procedure when the target satellite is available.

In the present disclosure, enhancements to the unified TCI States activation/deactivation MAC CE are provided to support unified TCI states activation and deactivation for multi-TRP operation.

A UE receives a MAC CE (e.g., enhanced unified TCI states activation/deactivation MAC CE) in a MAC PDU on a serving cell and indicates to lower layers the information regarding the received MAC CE.

In an embodiment, some reserved bits can be used for new indication in the existing unified TCI states activation/deactivation MAC CE. In another embodiment, a new MAC CE can be introduced, e.g., enhanced unified TCI states activation/deactivation MAC CE, which can be identified by a LCID or an eLCID included in a MAC subheader contained in the MAC PDU. In this disclosure, the enhanced unified TCI states activation/deactivation MAC CE can be dedicated for joint TCI states or for separate TCI states for unified TCI state framework.

FIGS. 6-12 illustrate examples of unified TCI states activation/deactivation MAC CE 600-1200 according to embodiments of the present disclosure. Embodiments as shown in FIGS. 6-12 are for illustration only.

Figure 6:
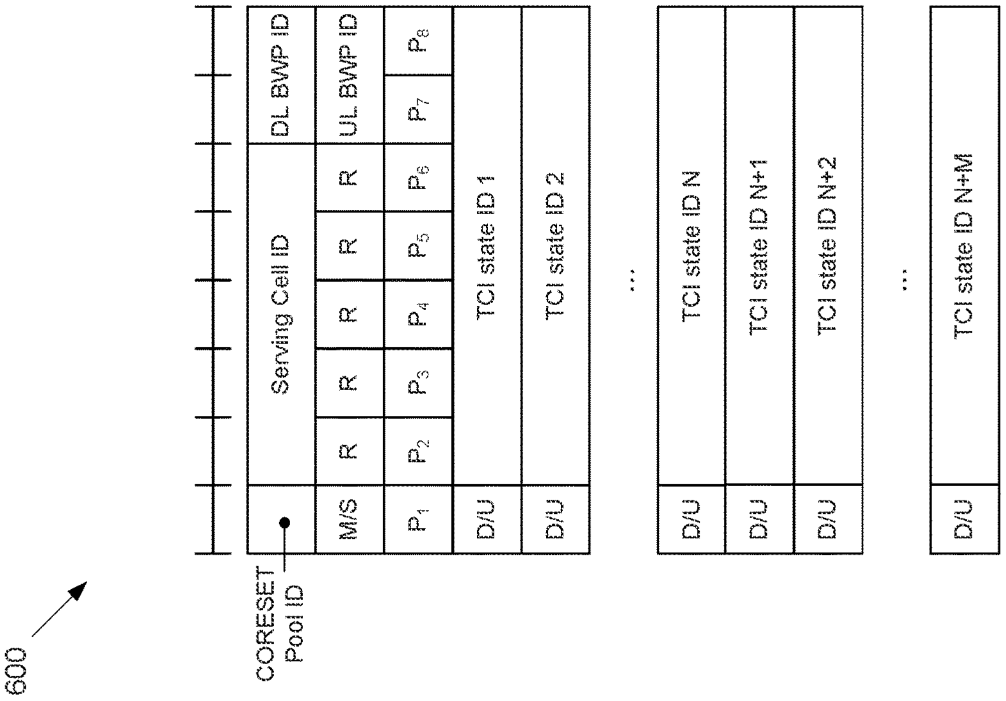

As illustrated in FIG. 6, an example of the (enhanced) unified TCI states activation/deactivation MAC CE is illustrated. The fields in the MAC CE are described as follows.

The (enhanced) unified TCI states activation/deactivation MAC CE is identified by a MAC subheader with eLCID as specified in 3GPP standard specification. The MAC CE includes a variable size including following fields.

In one example, the MAC CE includes a CORESET pool ID. This field indicates that a mapping between the activated TCI states and the codepoint of the DCI transmission configuration indication set by field TCI State ID is specific to the ControlResourceSetId configured with CORESET pool ID as specified in TS 38.331. This field set to 1 indicates that this MAC CE may be applied for the DL transmission scheduled by CORESET with the CORESET pool ID equal to 1, otherwise, this MAC CE may be applied for the DL transmission scheduled by CORESET pool ID equal to 0. If the coresetPoolIndex is not configured for any CORESET in the corresponding BWP, or if no more than one coresetPoolIndex is configured for any CORESET in the corresponding BWP, or if coresetPoolIndex with only value zero is configured for any CORESET in the corresponding BWP, MAC entity may ignore the CORESET pool ID field in this MAC CE when receiving the MAC CE. If the serving cell in the MAC CE is configured in a cell list that contains more than one serving cell, the CORSET pool ID field may be ignored when receiving the MAC CE.

In one example, the MAC CE includes an M/S field. This field indicates whether the TCI state IDs indicated in this MAC CE is for a single TRP or for two TRPs (i.e., TCI state IDs for the second TRP are present in this MAC CE), when the field CORESET pool ID is ignored. This field set to 0 indicates the TCI state IDs are for a single TRP. This field set to 1 indicates the TCI state IDs are for two TRPs (i.e., TCI state IDs for the second TRP are present).

In one example, the MAC CE includes a serving cell ID. This field indicates the identity of the serving cell for which the MAC CE applies. The length of the field is 5 bits. If the indicated serving cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively.

In one example, the MAC CE includes a DL BWP ID field. This field indicates a DL BWP for which the MAC CE applies as the codepoint of the DCI bandwidth part indicator field as specified in TS 38.212. The length of the BWP ID field is 2 bits.

In one example, the MAC CE includes a UL BWP ID field. This field indicates a UL BWP for which the MAC CE applies as the codepoint of the DCI bandwidth part indicator field as specified in TS 38.212. If value of unifiedTCI-StateType in the serving cell indicated by serving cell ID is joint, this field is considered as the reserved bits. The length of the BWP ID field is 2 bits.

Figure 7:
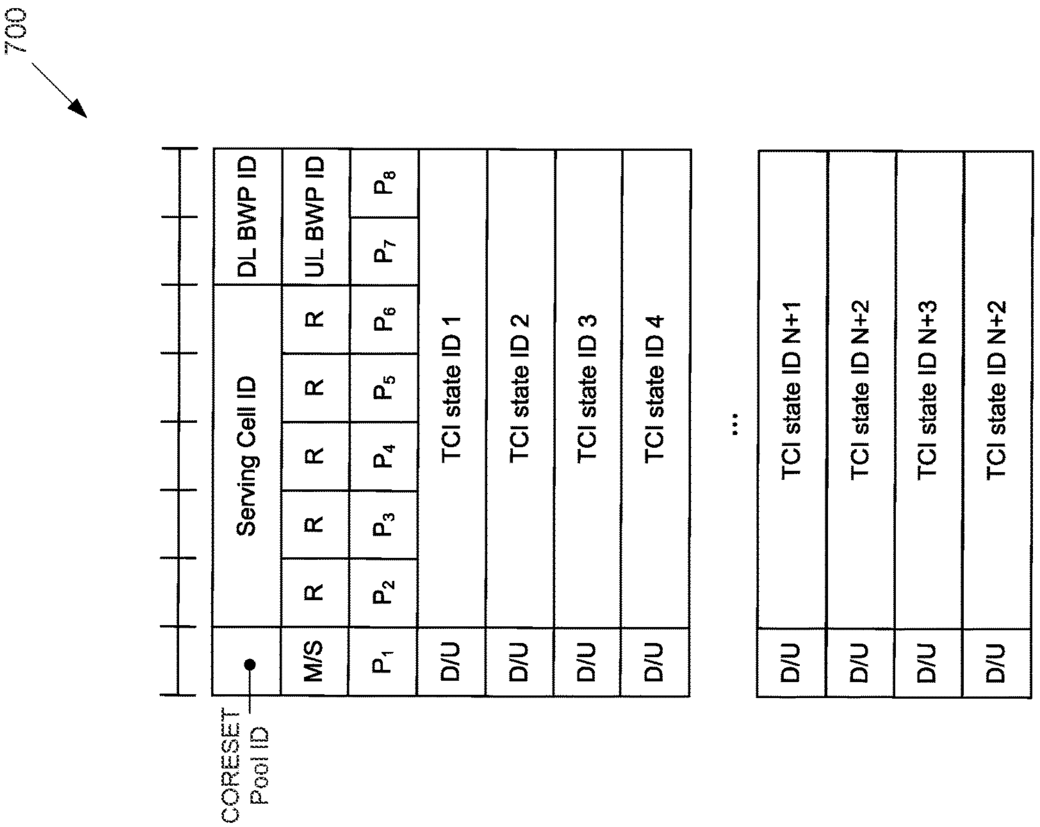

In one example, the MAC CE includes a $P_i$ field. This field indicates whether each TCI codepoint has multiple TCI states or single TCI state. As shown in FIG. 6 and FIG. 7, one octet of $P_i$ fields is present. If M/S field is set to 0, and if $P_i$ field is set to 1, it is indicated that $i^{th}$ TCI codepoint includes the DL TCI state and the UL TCI state for a single TRP. If M/S field is set to 0, and if $P_i$ field is set to 0 for i=1, . . . 8, it is indicated that $i^{th}$ TCI codepoint includes only the DL/joint TCI state or the UL TCI state for the single TRP. If M/S field is set to 1, and if $P_i$ field is set to 1 for i=1, . . . 8, it is indicated that $i^{th}$ TCI codepoint includes a pair of DL TCI state and UL TCI state for the first TRP, and another pair of DL TCI state and UL TCI state for the second TRP. If M/S field is set to 1, and if $P_i$ field is set to 0 for i=1, . . . 8, it is indicated that $i^{th}$ TCI codepoint includes one DL/joint TCI state or one UL TCI state for the first TRP, and another DL/joint TCI state or another UL TCI state for the second TRP.

Figure 9:
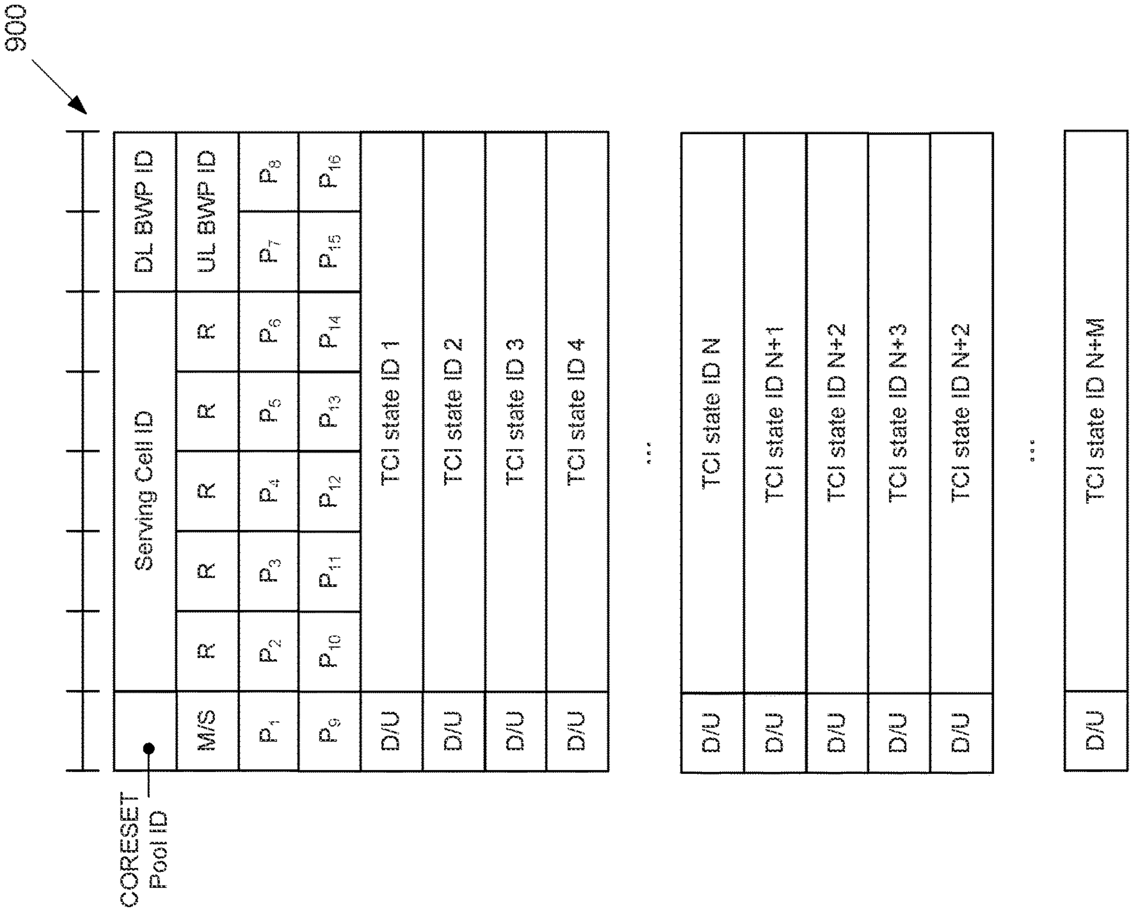
Figure 8:
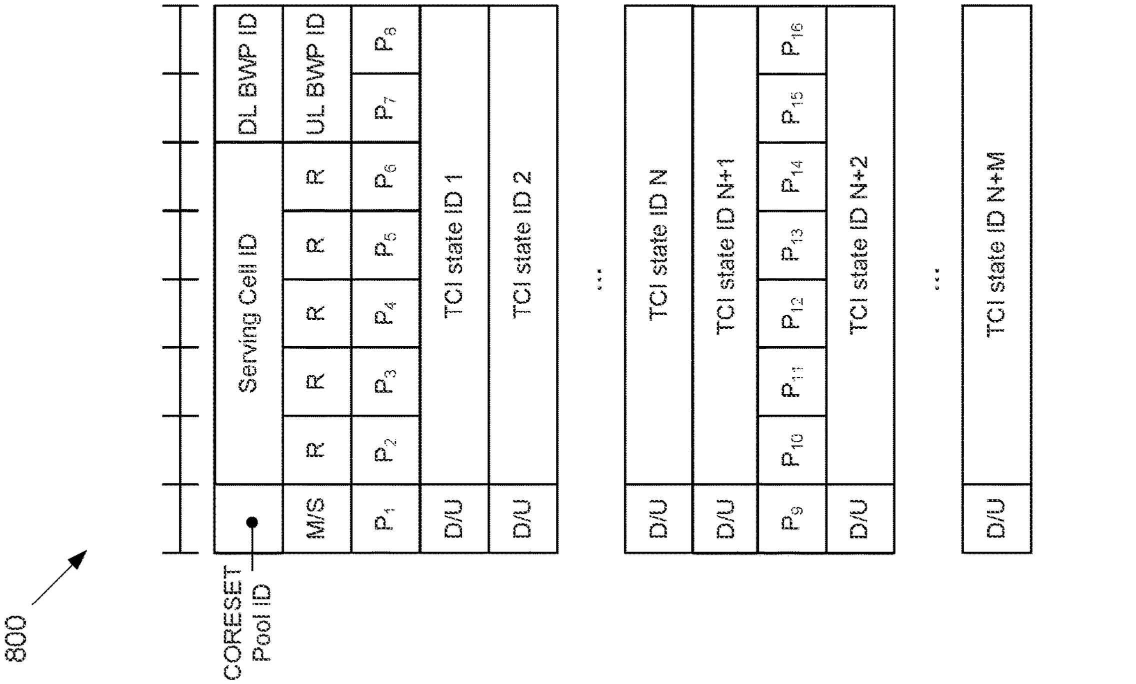
Figure 10:
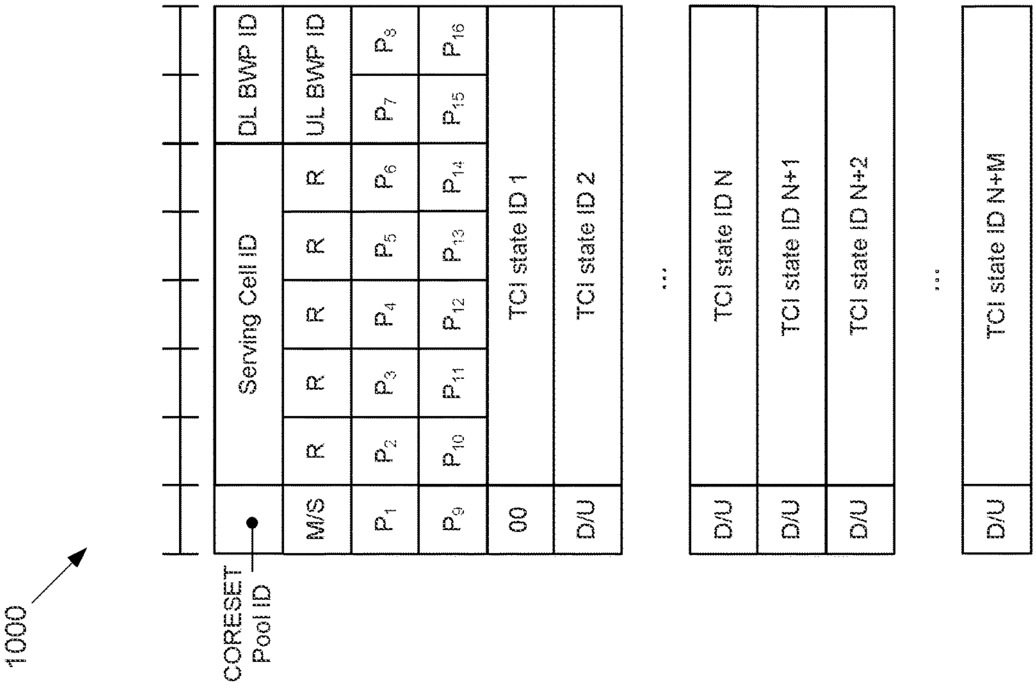

Alternatively, as shown in FIG. 8, FIG. 9, and FIG. 10, two octets of $P_i$ fields can be present. The octet of $P_i$ field for i=9, . . . , 16 is only present if M/S field is set to 1. If M/S field is set to 0, and if $P_i$ field is set to 1, it is indicated that $i^{th}$ TCI codepoint includes the DL TCI state and the UL TCI state for a single TRP. If M/S field is set to 0, and if $P_i$ field is set to 0 for i=1, . . . 8, it is indicated that $i^{th}$ TCI codepoint includes only the DL/joint TCI state or the UL TCI state for the single TRP. If M/S field is set to 1, $P_i$ field set to 1 for i=1, . . . , 8 indicates that $i^{th}$ TCI codepoint includes a pair of DL TCI state and UL TCI state for the first TRP; $P_i$ field set to 1 for i=9, . . . , 16 indicates that $(i-8)^{th}$ TCI codepoint includes another pair of DL TCI state and UL TCI state for the second TRP; $P_i$ field set to 0 for i=1, . . . , 8 indicates that $i^{th}$ TCI codepoint includes one DL/joint TCI state or one UL TCI state for the first TRP; $P_i$ field set to 0 for i=9, . . . , 16 indicates that $(i-8)^{th}$ TCI codepoint includes another DL/joint TCI state or another UL TCI state for the second TRP.

In one example, the MAC CE includes a D/U filed. This field indicates whether the TCI state ID in the same octet is for a joint/downlink or uplink TCI state. If this field is set to 1, the TCI state ID in the same octet is for joint/downlink. If this field is set to 0, the TCI state ID in the same octet is for uplink;

In one example, the MAC CE includes a TCI state ID field. This field indicates the TCI state identified by TCI-StateId as specified in TS 38.331. If D/U is set to 1, 7-bits length TCI state ID may TCI-StateId as specified in TS 38.331 is used. If D/U is set to 0, the most significant bit of TCI state ID is considered as the reserved bit and remainder 6 bits indicate the UL-TCIState-Id as specified in TS 38.331.

For examples illustrated in FIG. 6 and FIG. 8, if the field M/S is set to 0, the TCI state IDs for the single TRP are indicated in by N octets. If the field M/S is set to 1, the TCI state IDs for the first TRP are indicated in the first N octets, and the TCI state IDs for the second TRP are indicate in the following M octets containing TCI state IDs. The TCI state IDs among the first N octets for different codepoints are indicated in ascending order of i. The TCI state IDs among the following M octets for different codepoints are indicated in ascending order of i. Alternatively (as illustrated in FIG. 5), if the field M/S is set to 0, the TCI state IDs for the single TRP are indicated in by N octets. If the field M/S is set to 1, the TCI state ID(s) for codepoint i for the first TRP are followed by the TCI state ID(s) for codepoint i for the second TRP, i.e., if $P_i$ is set to 1, the TCI state ID n+1 is for the first TRP and the TCI state ID n+2 is for the second TRP, TCI state n+3 and TCI state n+4 are absent, and so on; if $P_i$ is set to 0, the TCI state ID n+1 and the TCI state ID n+2 are for the first TRP, the TCI state n+3 and TCI state n+4 are for the second TRP, and so on. The TCI state IDs for different codepoints are indicated in ascending order of i.

Alternatively, as illustrated in FIG. 9 and FIG. 10, if the field M/S is set to 0, the TCI state IDs for the single TRP are indicated in by N octets. If the field M/S is set to 1, the TCI state ID(s) for codepoint i for the first TRP are followed by the TCI state ID(s) for codepoint i for the second TRP, i.e., if $P_i$ is set to 1 and $P_i$+8 is set to 1 for i=1, . . . , 8, the TCI state ID n+1 is for the first TRP and the TCI state ID n+2 is for the second TRP, TCI state n+3 and TCI state n+4 are absent; if $P_i$ is set to 1 and $P_i$+8 is set to 0 for i=1, . . . , 8, the TCI state ID n+1 is for the first TRP, and the TCI state ID n+2 and TCI state ID n+3 is for the second TRP, TCI state n+4 is absent; if $P_i$ is set to 0 and $P_i$+8 is set to 1 for i=1, . . . , 8, the TCI state ID n+1 and the TCI state ID n+2 are for the first TRP, and the TCI state ID n+3 is for the second TRP, TCI state n+4 are absent; if $P_i$ is set to 0 and $P_i$+8 is set to 0 for i=1, . . . , 8, the TCI state ID n+1 and the TCI state ID n+2 are for the first TRP, and the TCI state ID n+3 and TCI state n+4 are for the second TRP; and so on. The TCI state IDs for different codepoints are indicated in ascending order of i.

In one example, the maximum number of activated TCI states is 32.

In one example, the MAC CE includes an R field. The is the reserved bit that is set to 0.

Figure 11:
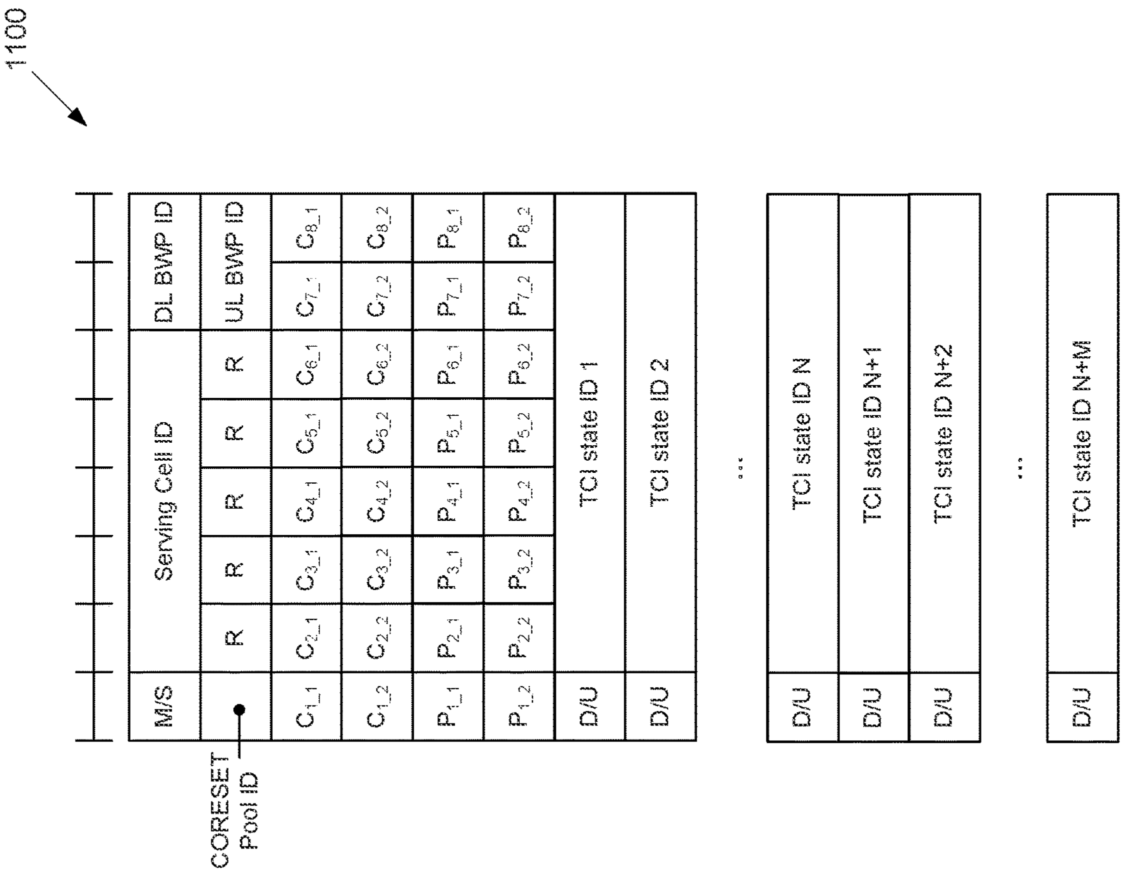

In one another embodiment, as shown in FIG. 11, the (Enhanced) unified TCI states activation/deactivation MAC CE is identified by a MAC subheader with eLCID as specified in 3GPP standard specification. The MAC CE includes a variable size consisting of one or more of the following fields.

In one example, the MAC CE includes an M/S field. This field indicates whether the TCI state IDs indicated in this MAC CE is for a single TRP or for two TRPs. This field set to 0 indicates the TCI state IDs are for a single TRP. This field set to 1 indicates the TCI state IDs are for two TRPs (i.e., TCI state IDs for the second TRP are present).

In one example, the MAC CE includes a CORESET pool ID field. This field indicates that the TCI state IDs indicated in this MAC CE are specific to which ControlResourceSetId configured with CORESET pool ID as specified in TS 38.331 when M/S field is set to 0. When M/S field is set to 1, this field is considered as a reserved bit. This field set to 1 indicates that the TCI state IDs indicated in this MAC CE are specific to CORESET pool ID 1, otherwise, the TCI state IDs indicated in this MAC CE are specific to CORESET pool ID 0. If the coresetPoolIndex is not configured for any CORESET in the corresponding BWP, or if no more than one coresetPoolIndex is configured for any CORESET in the corresponding BWP, or if coresetPoolIndex with only value zero is configured for any CORESET in the corresponding BWP, MAC entity may ignore this field. If the serving cell in the MAC CE is configured in a cell list that contains more than one serving cell, the CORSET pool ID field may be ignored when receiving the MAC CE.

In one example, the MAC CE includes a serving cell ID field. This field indicates the identity of the serving cell for which the MAC CE applies. The length of the field is 5 bits. If the indicated serving cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively;

In one example, the MAC CE includes a DL BWP ID field. This field indicates a DL BWP for which the MAC CE applies as the codepoint of the DCI bandwidth part indicator field as specified in TS 38.212. The length of the BWP ID field is 2 bits;

In one example, the MAC CE includes a UL BWP ID field. This field indicates a UL BWP for which the MAC CE applies as the codepoint of the DCI bandwidth part indicator field as specified in TS 38.212. If value of unifiedTCI-StateType in the serving cell indicated by serving cell ID is joint, this field is considered as the reserved bits. The length of the BWP ID field is 2 bits.

In one example, the MAC CE includes a $C_{i-k}$ field. This field indicates for the k-th TRP that corresponds to CORESET pool ID k−1 whether TCI state ID(s) for i-th TCI codepoint is present or not, where k=1, 2, and i=1, . . . 8. This field set to 1 indicates for the i-th TCI codepoint for the k-th TRP the TCI state ID(s) is present, this field set to 0 indicates for i-th TCI codepoint for the k-th TRP the TCI state ID(s) are not present. Here the TCI state ID is for a joint TCI state, a DL TCI state, or a separate TCI state. If M/S field is set to 0, and CORESET pool ID is set to 0, the octet for $C_{i-1}$ and the octet for $P_{i-1}$ are present, the octet for $C_{i-2}$ and the octet for $P_{i-2}$ are not present; If M/S field is set to 0, and CORESET pool ID is set to 1, the octet for $C_{i-1}$ and the octet for $P_{i-1}$ are not present, the octet for $C_{i-2}$ and the octet for $P_{i-2}$ are present. If M/S field is set to 1, all octets for $C_{i-k}$ and $P_{i-1}$ are present.

In one example, the MAC CE includes a $P_{i-k}$ field. This field indicates for the k-th TRP that corresponds to CORESET pool ID k−1 whether i-th TCI codepoint has two TCI state IDs or single TCI state ID indicated if $C_{i-k}$ is set to 1. This field is absent if unified TCI state is configured as joint by upper layer parameter. This field present if unified TCI state is configured as separate by upper layer parameter. If $C_{i-k}$ is set to 0, $P_{i-k}$ is considered as a reserved bit. If $C_{i-k}$ is set to 1, and if $P_{i-k}$ field is set to 0, it is indicated that one TCI state ID is indicated for the i-th TCI codepoint for the k-th TRP. If $C_{i-k}$ is set to 1, and if $P_{i-k}$ field is set to 1, it is indicated that two TCI state IDs are indicated for the i-th TCI codepoint for the k-th TRP.

In one example, the MAC CE includes a D/U field. This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink.

In one example, the MAC CE includes a TCI state ID field. This field indicates the TCI state identified by TCI-StateId as specified in TS 38.331. If D/U is set to 1, 7-bits length TCI state ID may TCI-StateId as specified in TS 38.331 is used. If D/U is set to 0, the most significant bit of TCI state ID is considered as the reserved bit and remainder 6 bits indicate the UL-TCIState-Id as specified in TS 38.331. For examples illustrated in FIG. 6 and FIG. 8, if the field M/S is set to 0, the TCI state IDs for the single TRP are indicated in by N octets. If the field M/S is set to 1, the TCI state IDs for the first TRP are indicated in the first N octets, and the TCI state IDs for the second TRP are indicate in the following M octets containing TCI state IDs. The TCI state IDs among the first N octets for different codepoints are indicated in ascending order of i. The TCI state IDs among the following M octets for different codepoints are indicated in ascending order of i.

In one example, the maximum number of activated TCI states is 32.

In one example, the MAC CE includes an R filed. The R field is a reserved bit set to 0.

In one another embodiment, as shown in FIG. 12, the (enhanced) unified TCI states activation/deactivation MAC CE is identified by a MAC subheader with eLCID as specified in 3GPP standard specification. The MAC CE includes a variable size comprising one or more of the following fields.

In one example, the MAC CE includes a serving cell ID field. This field indicates the identity of the serving cell for which the MAC CE applies. The length of the field is 5 bits. If the indicated serving cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively.

In one example, the MAC CE includes a DL BWP ID field. This field indicates a DL BWP for which the MAC CE applies as the codepoint of the DCI bandwidth part indicator field as specified in TS 38.212. The length of the BWP ID field is 2 bits.

In one example, the MAC CE includes a UL BWP ID field. This field indicates a UL BWP for which the MAC CE applies as the codepoint of the DCI bandwidth part indicator field as specified in TS 38.212. If value of unifiedTCI-StateType in the serving cell indicated by serving cell ID is joint, this field is considered as the reserved bits. The length of the BWP ID field is 2 bits.

In one example, the MAC CE includes a $C_{i-k}$ field. This field indicates for the k-th TRP that corresponds to CORESET pool ID k−1 whether TCI state ID(s) for i-th TCI codepoint is present or not, where k=1, 2, and i=1, . . . 8. This field set to 1 indicates for the i-th TCI codepoint for the k-th TRP the TCI state ID(s) is present, this field set to 0 indicates for i-th TCI codepoint for the k-th TRP the TCI state ID(s) are not present. Here the TCI state ID is for a joint TCI state, a DL TCI state, or a separate TCI state.

In one example, the MAC CE includes a $P_{i-k}$ field. This field indicates for the k-th TRP that corresponds to CORESET pool ID k−1 whether i-th TCI codepoint has two TCI state IDs or single TCI state ID indicated if $C_{i-k}$ is set to 1. This field is absent if unified TCI state is configured as joint by upper layer parameter. This field present if unified TCI state is configured as separate by upper layer parameter. If $C_{i-k}$ is set to 0, $P_{i-k}$ if present is considered as a reserved bit. If $C_{i-k}$ is set to 1, and if $P_{i-k}$ field is set to 0, it is indicated that one TCI state ID is indicated for the i-th TCI codepoint for the k-th TRP. If $C_{i-k}$ is set to 1, and if $P_{i-k}$ field is set to 1, it is indicated that two TCI state IDs are indicated for the i-th TCI codepoint for the k-th TRP.

In one example, the MAC CE includes a D/U field. This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink.

In one example, the MAC CE includes a TCI state ID field. This field indicates the TCI state identified by TCI-StateId as specified in TS 38.331. If D/U is set to 1, 7-bits length TCI state ID may TCI-StateId as specified in TS 38.331 is used. If D/U is set to 0, the most significant bit of TCI state ID is considered as the reserved bit and remainder 6 bits indicate the UL-TCIState-Id as specified in TS 38.331. In one example, the TCI state IDs of the one TRP are in the first N octets, which are indicated in ascending order of i. The TCI state IDs of the other TRP are in the following M octets, which are indicated in ascending order of i. In another example, the TCI state IDs are indicated in ascending order of codepoint index I, where for each codepoint, the TCI state ID(s) for the first TRP is followed by the TCI state ID(s) for the other TRP. The maximum number of activated TCI states is 16 per TRP.

In one example, the maximum number of activated TCI states is 32.

In one example, the MAC CE includes an R field. This field is an reserved bit set to 0.

For a dual connectivity, a UE is required to handle a maximum UL timing difference between a PCell and a PSCell as specified in TS 38.133. That is, the UE may be capable of handling a maximum uplink transmission timing difference between PCell and PSCell as shown in TABLE 1, given that the UE indicates that the UE is capable of asynchronous NR DC.

TABLE 1

Maximum uplink transmission timing difference requirement for inter-band asynchronous NR DC

| Max {Sub-carrier spacing in PCell (kHz), Sub-carrier spacing in PSCell (kHz)} | Maximum uplink transmission timing difference (μs) |
|---|---|
| 15 | 500 |
| 30 | 250 |
| 60 | 125 |
| 120 | 62.5 |
| 480 | 15.625 |
| 960 | 7.8125 |

In TS 38.321, the relevant requirement for TAT expiry is specified as follows. When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

For a multi-TRP operation with more than one TAs, more than one TAG can be configured for a serving cell. For a SpCell, the 2 TAG can be primary TAGs (PTAG). The issue is the TAT(s) of which TAG(s) for the serving cell is considered as expired when the maximum uplink transmission timing difference between TAGs of MAC entities is exceeded.

In the present disclosure, an embodiment for handling TA and TAT is provided.

In one embodiment, when the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers all timeAlignmentTimer(s) associated with the SCell as expired.

In another embodiment, when the MAC entity stops uplink transmissions associated to an STAG due to the fact that the maximum uplink transmission timing difference between TAGs of the MAC entity or the maximum uplink transmission timing difference between TAGs of any MAC entity of the UE is exceeded, the MAC entity considers all timeAlignmentTimer(s) associated with the STAG as expired.

In yet another embodiment, when the MAC entity stops uplink transmissions associated to a PTAG due to the fact that the maximum uplink transmission timing difference between 2 PTAGs of the same MAC entity of the UE is exceeded, the MAC entity considers the timeAlignmentTimer associated with the PTAG as expired.

In one embodiment, for each STAG, if difference between TA of a STAG and TA of the first PTAG of a MAC entity or of any MAC entity is larger than the maximum uplink transmission timing difference, the TAT for the STAG is considered expired.

In another embodiment, for each STAG, if difference between TA of a STAG and TA of the second PTAG of a MAC entity or of any MAC entity is larger than the maximum uplink transmission timing difference, the TAT for the STAG is considered expired.

In yet another embodiment, for each STAG, if difference between TA of a STAG and TA of any one of all PTAGs of a MAC entity or of any MAC entity is larger than the maximum uplink transmission timing difference, the TAT for the STAG is considered expired.

In yet another embodiment, for each STAG, if difference between TA of a STAG and TA of each PTAGs of a MAC entity or of any MAC entity (e.g., N PTAGs if N TAGs are configured, N is an integer equal to or larger than 2) is larger than the maximum uplink transmission timing difference, the TAT for the STAG is considered expired.

In yet another embodiment, if two or more than two PTAGs are configured in a MAC entity, if difference between TA of a PTAG and TA of another PTAG of this MAC entity or of any MAC entity is larger than the maximum uplink transmission timing difference, the TAT(s) for TAG(s) of SCell(s) of this MAC entity is considered expired.

In yet another embodiment, if two or more than two PTAGs are configured in a MAC entity, if difference between TA of a PTAG of this MAC entity and TA of another PTAG of the other MAC entity is larger than the maximum uplink transmission timing difference, the TAT(s) for TAG(s) of SCell(s) of this MAC entity is considered expired.

In yet another embodiment, if two or more than two PTAGs are configured in a MAC entity, if difference between TA of a PTAG and TA of another PTAG of this MAC entity or of any MAC entity is larger than the maximum uplink transmission timing difference, the TAT for this PTAG of this MAC entity is considered expired.

In yet another embodiment, if two or more than two PTAGs are configured in a MAC entity, if difference between TA of a PTAG of this MAC entity and TA of another PTAG of the other MAC entity is larger than the maximum uplink transmission timing difference, the TAT for this PTAG(s) of this MAC entity is considered expired.

In yet another embodiment, if two PTAGs are configured in a MAC entity, for a PTAG, if difference between TA of the first PTAG and the second PTAG of this MAC entity is larger than the maximum uplink transmission timing difference, the TAT for the first PTAG configured with tag-Id is considered expired.

In yet another embodiment, if two PTAGs are configured in a MAC entity, for a PTAG, if difference between TA of the first PTAG and the second PTAG of this MAC entity is larger than the maximum uplink transmission timing difference, the TAT for both PTAGs are considered expired.

In yet another embodiment, if more than two PTAGs are configured in a MAC entity, for a PTAG, if difference between TA of the first PTAG and the k-th PTAG (e.g., k is an integer larger than 1) of this MAC entity is larger than the maximum uplink transmission timing difference, the TAT for the k-th PTAG is considered expired.

A UE stops any UL transmission if any one of the above cases happens.

The absolute timing advance command MAC CE includes the TA in used to control the amount of timing adjustment that the MAC entity may apply in TS 38.213.

In one embodiment, one reserved bit, renamed as TAG indication field, can be used to indicate one of the 2 TAGs (i.e., the first or the second TAG) if 2 TAGs are configured for a serving cell (e.g., SpCell). In another embodiment, 2 reserved bits, renamed as TAG ID field can be used to indicate the TAG ID of a TAG if 2 or more TAGS are configured for a serving cell. If only one TAG is configured for the serving cell (i.e., SpCell), the reserved bit(s) is present instead of TAG indication/ID field.

TABLE 2 shows the MAC entity.

TABLE 2

| MAC entity |
|---|
| As an embodiment, for a MAC entity, |
| 1> when an Absolute Timing Advance Command is received in response to a MSGA transmission including C-RNTI MAC CE as specified in clause 5.1.4a: |
| 2> if two TAGs are configured for the SpCell: |
| 3> apply the Timing Advance Command for the indicated PTAG; |
| 3> start or restart the timeAlignmentTimer associated with the indicated PTAG. |
| 2> else (i.e., if only one TAG is configured for the SpCell): |
| 3> apply the Timing Advance Command for PTAG; |
| 3> if there is ongoing Positioning SRS Transmission in RRC_INACTIVE as in clause 5.26: |
| 4> start or restart the inactivePosSRS-TimeAlignmentTimer associated with the indicated TAG. |
| 3> if CG-SDT procedure is ongoing: |
| 4> start or restart the cg-SDT-TimeAlignmentTimer associated with PTAG. |
| 3> else: |
| 4> start or restart the timeAlignmentTimer associated with PTAG. |

In yet another embodiment, if two PTAGs are configured in a MAC entity, for a PTAG, if difference between TA of the first PTAG and the second PTAG of this MAC entity is larger than the maximum uplink transmission timing difference, the TAT for the second PTAG is considered expired.

In yet another embodiment, if two PTAGs are configured in a MAC entity, for a PTAG, if difference between TA of the first PTAG and the second PTAG of this MAC entity is larger than the maximum uplink transmission timing difference, the TAT for the first PTAG is considered expired.

In yet another embodiment, if two PTAGs are configured in a MAC entity, for a PTAG, if difference between TA of the first PTAG and the second PTAG of this MAC entity is larger than the maximum uplink transmission timing difference, the TAT for the PTAG configured with tag-Id2 is considered expired.

A serving cell in NTN can provide configuration for satellite switch without PCI change, which can be broadcasted in system information or sent to a UE via dedicated signalling, e.g., RRC reconfiguration message.

When a UE performs RRC resume, the 2 TAG configuration for multi-TRP operation can be released when initiating RRC resume. In one embodiment, upon initiation of the RRC resume procedure, a UE releases the configuration of 2 TAGs, which can include tag-Id2, and/or the mapping between TAG ID and the TAG index (i.e., the first/second TAG) within a cell, and/or the second N_TAoffset parameter, and/or the list of RACH configurations for the additional PCI(s) associated to the serving cell. If the mapping is configured in a TAG configuration and/or in a joint/DL/UL TCI state configuration, the mapping is released.

When a UE performs RRC reestablishment, the 2 TAG configuration for multi-TRP operation can be released when initiating RRC reestablishment. In one embodiment, upon initiation of the RRC reestablishment procedure, if a UE is not configured with attemptCondReconfig, the UE releases the configuration of 2 TAGs, which can include tag-Id2, and/or the mapping between TAG ID and the TAG index (i.e., the first/second TAG) within a cell, and/or the second N_TAoffset parameter, and/or the list of RACH configurations for the additional PCI(s) associated to the serving cell. If the mapping is configured in a TAG configuration and/or in a joint/DL/UL TCI state configuration, the mapping is released.

In another embodiment, when a UE performs RRC setup and/or RRC resume and/or RRC re-establishment, if the configuration of 2 TAGs and/or the configuration of multi-TRP operation with 2 TAs is configured/stored/restored/applied by the UE, the UE applies the TAG associated with tag-Id (i.e., the mandatory parameter in Rel-15) included in the serving cell configuration and/or start the associated time alignment timer.

In one example, when performing RRC resume or RRC re-establishment, a UE may perform operation as shown in TABLE 3.

TABLE 3

| |
|---|
| 1> if the RRCSetup is received in response to an RRCReestablishmentRequest; or |
| 1> if the RRCSetup is received in response to an RRCResumeRequest or RRCResumeRequest1: |
| 2> if sdt-MAC-PHY-CG-Config is configured: |
| 3> instruct the MAC entity to stop the cg-SDT-TimeAlignmentTimer, if it is running; |
| 3> instruct the MAC entity to start the timeAlignmentTimer associated with the PTAG configured by tag-Id in ServingCellConfig, if it is not running. |
| Upon the reception of RRC resume message when performing RRC resume, UE may |
| 1> if sdt-MAC-PHY-CG-Config is configured: |
| 2> instruct the MAC entity to stop the cg-SDT-TimeAlignmentTimer, if it is running; |
| 2> instruct the MAC entity to start the timeAlignmentTimer associated with the PTAG configured by tag-Id in ServingCellConfig, if it is not running. |

In one embodiment, the SSB information of the target satellite for satellite switch can be included in the configuration. The SSB information can include the SSB indexes broadcasted by the target satellite and/or SSB indexes broadcasted by the serving satellite, and/or the associated timing information (e.g., the start time when the SSBs from the target satellite become available). The SSB information can include the parameter ssb-PositionsInBurst, which indicate the time domain positions of the transmitted SS-blocks in an SS-burst.

If a UE supports satellite switch with PCI unchanged, upon satellite switch is initiated or upon the start time of target satellite become available, a UE applies the SSB information when performing DL and/or UL synchronization with the target satellite. In an example, a UE searches the SSBs broadcasted by the target satellite and performs DL synchronization, and initiates RACH procedure or RACH-less procedure. The UE selects from the indicated SSBs for PRACH Preamble transmission.

In another embodiment, if a UE supports satellite switch with PCI unchanged, upon satellite switch is initiated or upon the start time of target satellite become available, the UE acquires MIB and/or SIB1 of the serving cell, reads the SSB information of the target satellite included in SIB1, and applies the SSB information for DL and/or UL synchronization with the target satellite. In an example, a UE searches the SSBs broadcasted by the target satellite and performs DL synchronization, and initiates RACH procedure or RACH-less procedure.

In one embodiment, the configuration for satellite switch without PCI change can include the time window for satellite switch and/or the SSB information for the time window. The time window can indicate the duration within which both source satellite and target satellite are available for the serving cell. The SSB information can indicate the SSB indexes broadcasted by the source satellite and/or the SSB indexes broadcasted by the target satellite within the time window. Upon satellite switch is initiated or upon the start time of the time window, a UE applies the SSB information when performing DL and/or UL synchronization with the target satellite. In an example, a UE searches the SSBs broadcasted by the target satellite and performs DL synchronization, and initiates RACH procedure or RACH-less procedure.

In another embodiment, the information on the SSBs to be broadcasted by the source satellite during an indicated time duration and information on the SSBs to be broadcasted by the target satellite can be broadcasted during the indicated time duration can be signalled in system information, (e.g., SIB19). In one example, the information includes the SSB indexes, which can be a subset of SSBs originally broadcasted before the switching. The SSB indexes of the subset SSBs can be indicated by one or more bitmaps, where a bit setting to zero means the corresponding SSB is absent from the satellite and a bit setting to 1 meaning the corresponding SSB is broadcasted by the satellite. If the SSB indexes associated to the source satellite are signalled, the UE measures/searches the indicated SSBs from the source satellite during the indicated time duration. If the SSB indexes associated to the target satellite are signalled, the UE measures/searches/synchronizes to the indicated SSBs from the target satellite during the indicated time duration. If the SSB indexes associated to the target satellite are signalled, a UE applies the indicted SSBs to perform random access procedure to the target satellite. The UE selects from the indicated SSBs for PRACH Preamble transmission.

The time duration can refer to the time period that both the source satellite and the target satellite serving the cell. In one example, the time duration can be indicated by a start time and an end time, the start time can be indicated by t-Start, and the end time can be indicated by t-Service. In another example, the time duration can be indicated by a duration and a reference time, so that the start time can be derived based on the reference time and the duration. If the duration is positive, the start time is before the reference time, if the duration is negative, the reference time is the start time.

After the time duration, a UE releases the configuration of SSB indexes for the satellite switch. The UE can start to search measures/searches/synchronizes to all SSBs of the serving cell.

In one embodiment, the reference/start/end/service-stop time is indicated by an absolute time. The time can be in the format of UTC time that indicates a time in multiples of 10 ms after 00:00:00 on Gregorian calendar date 1 Jan. 1900 (midnight between Sunday, Dec. 31, 1899 and Monday, Jan. 1, 1900). The UE considers the reference point of the indicated time at the UL synchronization reference time, and considers the propagation delay between the UE and the reference point when determining the reference/start/end/service-stop time at the UE.

In the RACH-less procedure in satellite switch without PCI change, upon (the start time of) satellite switch, a UE starts DL synchronization with the target satellite applying the SSB information, starts RRC timer T430 when performing UL synchronization, indicate to lower layer (e.g., MAC entity) T430 starts, starts the TAT for the PTAG of the MAC entity upon the MAC entity receives an upper layer indication.

In an RACH-less HO procedure for L3 mobility, upon executing the HO, a UE starts DL synchronization with the target satellite applying the SSB information, starts RRC timer T430 when performing UL synchronization, indicate to lower layer (e.g., MAC entity) T430 starts, starts the TAT for the PTAG of the MAC entity upon the MAC entity receives an upper layer indication.

In one another embodiment, as shown in FIG. 13, the (enhanced) unified TCI states activation/deactivation MAC CE is identified by a MAC subheader with eLCID as specified in 3GPP standard specification. The MAC CE includes one or more of the following fields.

In one example, the MAC CE includes an M/S field, his field indicates whether the TCI state IDs indicated in this MAC CE is for a single TRP or for two TRPs. This field set to 0 indicates the TCI state IDs are for a single TRP. This field set to 1 indicates the TCI state IDs are for two TRPs (i.e., TCI state IDs for the second TRP are present).

In one example, the MAC CE includes a CORESET pool ID field. This field indicates that the TCI state IDs indicated in this MAC CE are specific to which ControlResourceSetId configured with CORESET Pool ID as specified in TS 38.331 when M/S field is set to 0. When M/S field is set to 1, this field is considered as a reserved bit. This field set to 1 indicates that the TCI state IDs indicated in this MAC CE are specific to CORESET pool ID 1, otherwise, the TCI state IDs indicated in this MAC CE are specific to CORESET pool ID 0. If the coresetPoolIndex is not configured for any CORESET in the corresponding BWP, or if no more than one coresetPoolIndex is configured for any CORESET in the corresponding BWP, or if coresetPoolIndex with only value zero is configured for any CORESET in the corresponding BWP, MAC entity shall ignore this field. If the serving cell in the MAC CE is configured in a cell list that contains more than one serving cell, the CORSET Pool ID field shall be ignored when receiving the MAC CE.

In one example, the MAC CE includes a serving cell ID filed. This field indicates the identity of the serving cell for which the MAC CE applies. The length of the field is 5 bits. If the indicated serving cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively.

In one example, the MAC CE includes a DL BWP ID field. This field indicates a DL BWP for which the MAC CE applies as the codepoint of the DCI bandwidth part indicator field as specified in TS 38.212. The length of the BWP ID field is 2 bits.

In one example, the MAC CE includes a UL BWP ID filed. This field indicates a UL BWP for which the MAC CE applies as the codepoint of the DCI bandwidth part indicator field as specified in TS 38.212. If value of unifiedTCI-StateType in the serving cell indicated by serving cell ID is joint, this field is considered as the reserved bits. The length of the BWP ID field is 2 bits.

In one example, the MAC CE includes a $C_{i-k}$ field. This field indicates for the k-th TRP that corresponds to CORESET Pool ID k−1 whether TCI state ID(s) for i-th TCI codepoint is present or not, where k=1, 2, and i=1, . . . 8. This field set to 1 indicates for the i-th TCI codepoint for the k-th TRP the TCI state ID(s) is present, this field set to 0 indicates for i-th TCI codepoint for the k-th TRP the TCI state ID(s) are not present. If M/S field is set to 0, and CORESET Pool ID is set to 0, the octet for $C_{i-1}$ and the octet for $P_{i-1}$ are present, the octet for $C_{i-2}$ and the octet for $P_{i-2}$ are not present; If M/S field is set to 0, and CORESET Pool ID is set to 1, the octet for $C_{i-1}$ and the octet for $P_{i-1}$ are not present, the octet for $C_{i-2}$ and the octet for $P_{i-2}$ are present. If M/S field is set to 1, all octets for $C_{i-k}$ and $P_{i-1}$ are present.

In one example, the MAC CE includes a $P_{i-k}$ field. This field indicates for the k-th TRP that corresponds to CORESET Pool ID k−1 whether i-th TCI codepoint has two TCI state IDs or single TCI state ID indicated if $C_{i-k}$ is set to 1. This field is absent if unified TCI state is configured as joint by upper layer parameter. This field present if unified TCI state is configured as separate by upper layer parameter. If $C_{i-k}$ is set to 0, $P_{i-k}$ is considered as a reserved bit. If $C_{i-k}$ is set to 1, and if $P_{i-k}$ field is set to 0, it indicates that one TCI state ID is indicated for the i-th TCI codepoint for the k-th TRP. If $C_{i-k}$ is set to 1, and if $P_{i-k}$ field is set to 1, it indicates that two TCI state IDs are indicated for the i-th TCI codepoint for the k-th TRP.

In one example, the MAC CE includes a D/U filed. This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink.

In one example, the MAC CE includes a TCI state ID field. This field indicates the TCI state identified by TCI-StateId as specified in TS 38.331. If D/U is set to 1, 7-bits length TCI state ID i.e. TCI-StateId as specified in TS 38.331 is used. If D/U is set to 0, the most significant bit of TCI state ID is considered as the reserved bit and remainder 6 bits indicate the UL-TCIState-Id as specified in TS 38.331. For examples illustrated in FIG. 4 and FIG. 6, if the field M/S is set to 0, the TCI state IDs for the single TRP are indicated in by N octets. If the field M/S is set to 1, the TCI state IDs for the first TRP are indicated in the first N octets, and the TCI state IDs for the second TRP are indicate in the following M octets containing TCI state IDs. The TCI state IDs among the first N octets for different codepoints are indicated in ascending order of i. The TCI state IDs among the following M octets for different codepoints are indicated in ascending order of i.

The maximum number of activated TCI states is 32.

In one example, the MAC CE includes R. This filed includes a reserved bit that is set to 0.

In one another embodiment, as shown in FIG. 14, the (enhanced) unified TCI states activation/deactivation MAC CE is identified by a MAC subheader with eLCID as specified in 3GPP standard specification. The MAC CE includes a variable size consisting of one or more of the following fields.

In one example, the MAC CE includes a serving cell ID filed. This field indicates the identity of the serving cell for which the MAC CE applies. The length of the field is 5 bits. If the indicated serving cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively.

In one example, the MAC CE includes a DL BWP ID field. This field indicates a DL BWP for which the MAC CE applies as the codepoint of the DCI bandwidth part indicator field as specified in TS 38.212. The length of the BWP ID field is 2 bits.

In one example, the MAC CE includes a UL BWP ID field. This field indicates a UL BWP for which the MAC CE applies as the codepoint of the DCI bandwidth part indicator field as specified in TS 38.212. If value of unifiedTCI-StateType in the serving cell indicated by serving cell ID is joint, this field is considered as the reserved bits. The length of the BWP ID field is 2 bits.

In one example, the MAC CE includes a $C_{i\text{-}k}$ field. This field indicates for the k-th TRP that corresponds to CORESET Pool ID k−1 whether TCI state ID(s) for i-th TCI codepoint is present or not, where k=1, 2, and i=1, . . . 8. This field set to 1 indicates for the i-th TCI codepoint for the k-th TRP the TCI state ID(s) is present, this field set to 0 indicates for i-th TCI codepoint for the k-th TRP the TCI state ID(s) are not present.

In one example, the MAC CE includes a $P_{i\text{-}k}$ field. This field indicates for the k-th TRP that corresponds to CORESET Pool ID k−1 whether i-th TCI codepoint has two TCI state IDs or single TCI state ID indicated if $C_{i\text{-}k}$ is set to 1. This field is absent if unified TCI state is configured as joint by upper layer parameter. This field present if unified TCI state is configured as separate by upper layer parameter. If $C_{i\text{-}k}$ is set to 0, $P_{i\text{-}k}$ if present is considered as a reserved bit. If $C_{i\text{-}k}$ is set to 1, and if $P_{i\text{-}k}$ field is set to 0, it indicates that one TCI state ID is indicated for the i-th TCI codepoint for the k-th TRP. If $C_{i\text{-}k}$ is set to 1, and if $P_{i\text{-}k}$ field is set to 1, it indicates that two TCI state IDs are indicated for the i-th TCI codepoint for the k-th TRP.

In one example, the MAC CE includes a D/U field. This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink.

In one example, the MAC CE includes a TCI state ID field. This field indicates the TCI state identified by TCI-StateId as specified in TS 38.331. If D/U is set to 1, 7-bits length TCI state ID i.e. TCI-StateId as specified in TS 38.331 is used. If D/U is set to 0, the most significant bit of TCI state ID is considered as the reserved bit and remainder 6 bits indicate the UL-TCIState-Id as specified in TS 38.331. In one example, the TCI state IDs of the one TRP are in the first N octets, which are indicated in ascending order of i. The TCI state IDs of the other TRP are in the following M octets, which are indicated in ascending order of i. In another example, the TCI state IDs are indicated in ascending order of codepoint index I, where for each codepoint, the TCI state ID(s) for the first TRP is followed by the TCI state ID(s) for the other TRP. The maximum number of activated TCI states is 16 per TRP.

The maximum number of activated TCI states is 32;

In one example, the MAC CE includes an R filed. This includes a reserved bit that is et to 0.

Figure 15:
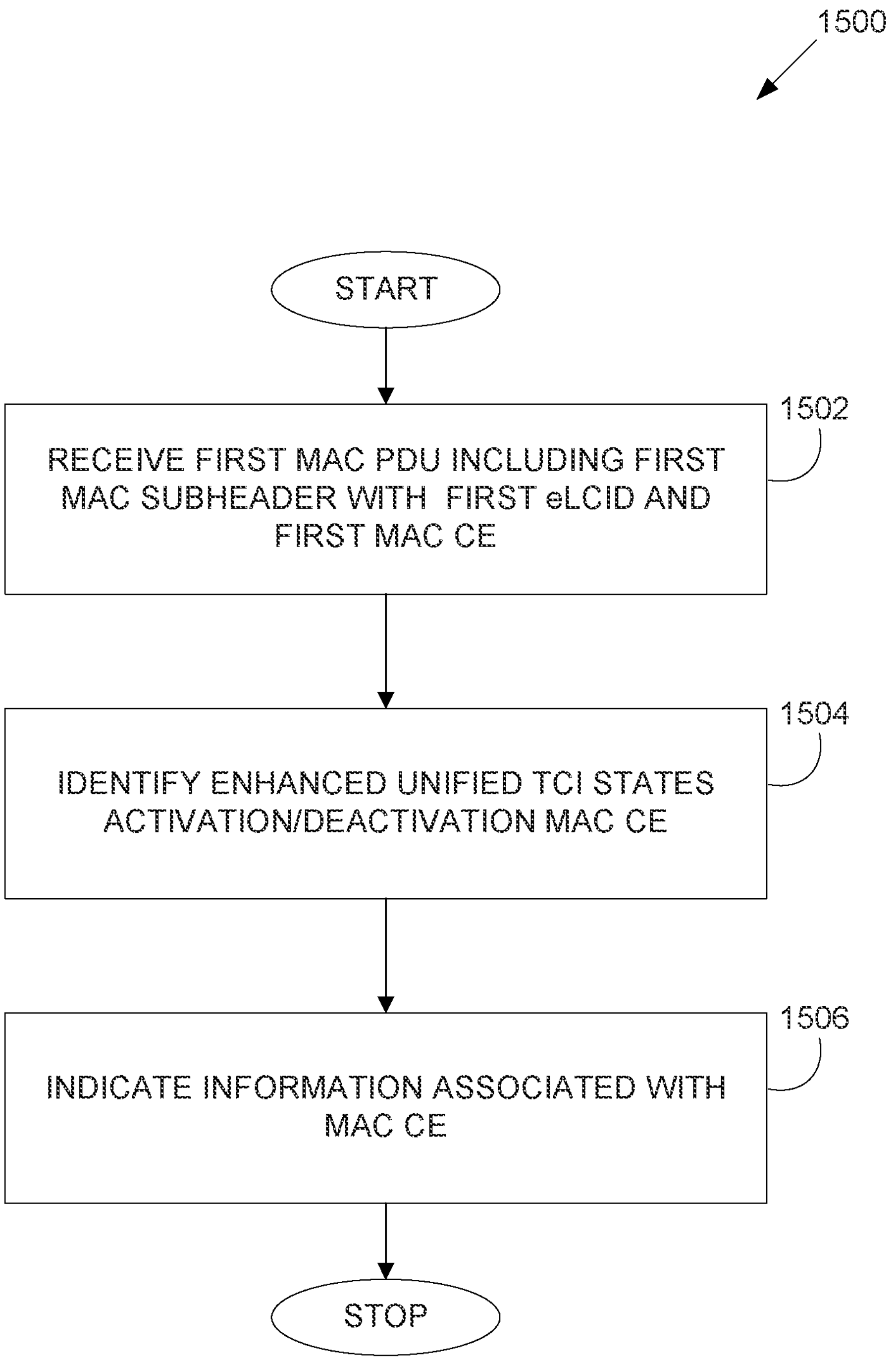
FIG. 15 illustrates a flowchart of a UE method for a MAC CE for multi-TRP operation in a wireless communication system according to embodiments of the present disclosure.

FIG. 15 illustrates a flowchart of a UE method 1500 for a MAC CE for multi-TRP operation in a wireless communication system according to embodiments of the present disclosure. The method 1500 as may be performed by a UE (e.g., 111-116 as illustrated in FIG. 1). An embodiment of the method 15 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1502. In step 1502, the UE receives, from a BS belonging to a serving cell, a first MAC PDU including a first MAC subheader with a first eLCID and a first MAC CE.

In step 1504, the UE identifies, based on the first eLCID, an enhanced unified TCI states activation/deactivation MAC CE for joint TCI states or separate TCI states including a bitmap of TCI state ID presence indications and TCI state IDs, wherein a bit in the bitmap of TCI state ID presence indications indicates, for the TCI state IDs associated with a codepoint of a DCI TCI field, whether a TCI state for a TRP is present in a corresponding MAC CE, and wherein a maximum number of the TCI state IDs that are activated is 32.

In step 1506, the UE indicates, to lower layers, information associated with the corresponding MAC CE.

In one embodiment, the UE receives a second MAC PDU including a second MAC subheader with a second eLCID and a second MAC CE, identifies, based on the second eLCID, a unified TCI states activation/deactivation MAC CE, determines whether CORESET pool IDs are configured for control resource sets, and identifies, based on a determination that the CORESET pool IDs are configured for the control resource sets, that the unified TCI states activation/deactivation MAC CE includes a CORESET pool ID.

In such embodiments, the CORESET pool ID indicates that a TCI state ID field is dedicated to a control resource set configured by the CORESET pool ID and the TCI state ID field indicates a mapping between activated TCI states and a code point of a DCI TCI.

In one embodiment, the UE identifies that the unified TCI states activation/deactivation MAC CE includes a reserved bit field when the CORESET pool IDs are not configured for the control resource sets.

In such embodiment, the enhanced unified TCI states activation/deactivation MAC CE for the joint TCI states or the separate TCI states further includes at least one of a serving cell ID, a DL BWP ID, or an UL BWP ID.

In one embodiment, the UE applies the corresponding MAC CE to entire serving cells identified in a list of serving cells when the indicated serving cell is included in the list of serving cells, wherein the serving cell ID is five bits long and indicates the serving cell where the corresponding MAC CE applies.

In such embodiment, the DL BWP ID and the UL BWP ID indicate a DL BWP and a UL BWP, respectively, where the corresponding MAC CE applies as a codepoint of a DCI BWP indicator and a DL BWP ID field is two bits long and a UL BWP ID field is two bits long.

In such embodiment, the bit in the bitmap of TCI state ID presence indications setting to one indicates that the TCI state for the TRP associated with the codepoint is present and setting to zero indicates that the TCI state for the TRP associated with the codepoint is absent.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:

a transceiver configured to receive, from a base station (BS) belonging to a serving cell, a first medium access control protocol data unit (MAC PDU) including a first MAC control element (MAC CE) and a first MAC subheader with a first enhanced logical channel identifier (eLCID); and a processor operably coupled with the transceiver, the processor configured to:

identify, based on the first eLCID, an enhanced unified transmission configuration indicator (TCI) states activation/deactivation MAC CE for separate TCI states, wherein the enhanced unified TCI states activation/deactivation MAC CE for separate TCI states includes a bitmap of TCI state identifier (ID) presence indications and TCI state IDs, wherein a bit in the bitmap of TCI state ID presence indications indicates, for the TCI state IDs associated with a codepoint of a downlink control information (DCI) TCI field, whether a TCI state for a transmission/reception point (TRP) associated with the codepoint is present in the enhanced unified TCI states activation/deactivation MAC CE for separate TCI states, and wherein a maximum number of the TCI state IDs that are activated is 32, and indicate, to lower layers, information associated with the enhanced unified TCI states activation/deactivation MAC CE for separate TCI states.

2. The UE of claim 1, wherein:

the transceiver is further configured to receive a second MAC PDU including a second MAC CE and a second MAC subheader with a second eLCID; and the processor is further configured to:

identify, based on the second eLCID, a unified TCI states activation/deactivation MAC CE, determine whether control resource set pool IDs (CORESET pool IDs) are configured for control resource sets, and identify, based on a determination that the CORESET pool IDs are configured for the control resource sets, that the unified TCI states activation/deactivation MAC CE includes a CORESET pool ID.

3. The UE of claim 2, wherein:

the CORESET pool ID indicates that a TCI state ID field is dedicated to a control resource set configured by the CORESET pool ID; and the TCI state ID field indicates a mapping between activated TCI states and a code point of a DCI TCI.

4. The UE of claim 2, wherein the processor is further configured to identify that the unified TCI states activation/deactivation MAC CE includes a reserved bit field when the CORESET pool IDs are not configured for the control resource sets.

5. The UE of claim 1, wherein the enhanced unified TCI states activation/deactivation MAC CE for the separate TCI states further includes at least one of a serving cell ID, a downlink bandwidth part ID (DL BWP ID), or an uplink BWP ID (UL BWP ID).

6. The UE of claim 5, wherein:

the serving cell ID is five bits long and indicates the serving cell for which the enhanced unified TCI states activation/deactivation MAC CE for separate TCI states applies; and the processor is further configured to apply the enhanced unified TCI states activation/deactivation MAC CE for separate TCI states to all serving cells identified in a list of serving cells.

7. The UE of claim 5, wherein:

the DL BWP ID and the UL BWP ID indicate a DL BWP and a UL BWP, respectively, for which the enhanced unified TCI states activation/deactivation MAC CE for separate TCI states applies as a codepoint of a DCI BWP indicator; and a DL BWP ID field is two bits long and a UL BWP ID field is two bits long.

8. The UE of claim 1, wherein:

a first value of the bit in the bitmap of TCI state ID presence indications indicates that the TCI state for the TRP associated with the codepoint is present, and a second value of the bit in the bitmap of TCI state ID presence indications indicates that the TCI state for the TRP associated with the codepoint is absent.

9. A method of a user equipment (UE) in a wireless communication system, the method comprising:

receiving, from a base station (BS) belonging to a serving cell, a first medium access control protocol data unit (MAC PDU) including a first MAC control element (MAC CE) and a first MAC subheader with a first enhanced logical channel identifier (eLCID);

identifying, based on the first eLCID, an enhanced unified transmission configuration indicator (TCI) states activation/deactivation MAC CE for separate TCI states, wherein the enhanced unified TCI states activation/deactivation MAC CE for separate TCI states includes a bitmap TCI state identifier (ID) presence indications and TCI state IDs, wherein a bit in the bitmap of TCI state ID presence indications indicates, for the TCI state IDs associated with a codepoint of a downlink control information (DCI) TCI field, whether a TCI state for a transmission/reception point (TRP) associated with the codepoint is present in the enhanced unified TCI states activation/deactivation MAC CE for separate TCI states, and wherein a maximum number of the TCI state IDs that are activated is 32; and indicating, to lower layers, information associated with the enhanced unified TCI states activation/deactivation MAC CE for separate TCI states.

10. The method of claim 9, further comprising:

receiving a second MAC PDU including a second MAC CE and a second MAC subheader with a second eLCID;

identifying, based on the second eLCID, a unified TCI states activation/deactivation MAC CE;

determining whether control resource set pool IDs (CORESET pool IDs) are configured for control resource sets; and identifying, based on a determination that the CORESET pool IDs are configured for the control resource sets, that the unified TCI states activation/deactivation MAC CE includes a CORESET pool ID.

11. The method of claim 10, wherein:

the CORESET pool ID indicates that a TCI state ID field is dedicated to a control resource set configured by the CORESET pool ID; and the TCI state ID field indicates a mapping between activated TCI states and a code point of a DCI TCI.

12. The method of claim 10, further comprising identifying that the unified TCI states activation/deactivation MAC CE includes a reserved bit field when the CORESET pool IDs are not configured for the control resource sets.

13. The method of claim 9, wherein the enhanced unified TCI states activation/deactivation MAC CE for the separate TCI states further includes at least one of a serving cell ID, a downlink bandwidth part ID (DL BWP ID), or an uplink BWP ID (UL BWP ID).

14. The method of claim 13, further comprising applying the enhanced unified TCI states activation/deactivation MAC CE for separate TCI states to all serving cells identified in a list of serving cells, wherein the serving cell ID is five bits long and indicates the serving cell for which the enhanced unified TCI states activation/deactivation MAC CE for separate TCI states applies.

15. The method of claim 13, wherein:

the DL BWP ID and the UL BWP ID indicate a DL BWP and a UL BWP, respectively, for which the enhanced unified TCI states activation/deactivation MAC CE for separate TCI states applies as a codepoint of a DCI BWP indicator; and a DL BWP ID field is two bits long and a UL BWP ID field is two bits long.

16. The method of claim 9, wherein:

a first value of the bit in the bitmap of TCI state ID presence indications indicates that the TCI state for the TRP associated with the codepoint is present, and a second value of the bit in the bitmap of TCI state ID presence indications indicates that the TCI state for the TRP associated with the codepoint is absent.

17. A base station (BS) in a wireless communication system, the BS comprising:

a processor configured to generate a first medium access control protocol data unit (MAC PDU) including a first MAC control element (MAC CE) and a first MAC subheader with a first enhanced logical channel identifier (eLCID); and a transceiver operably coupled to the processor, the transceiver configured to transmit, to a user equipment (UE), the first MAC PDU including first MAC CE and the first MAC subheader with the first eLCID, wherein the BS belongs to a serving cell, wherein an enhanced unified transmission configuration indicator (TCI) states activation/deactivation MAC CE for separate TCI states, wherein the enhanced unified TCI states activation/deactivation MAC CE for separate TCI states includes a bitmap of TCI state identifier (ID) presence indications and TCI state IDs is identified based on the first eLCID, wherein a bit in the bitmap of TCI state ID presence indications indicates, for the TCI state IDs associated with a codepoint of a downlink control information (DCI) TCI field, whether a TCI state for a transmission/reception point (TRP) associated with the codepoint is present in the enhanced unified TCI states activation/deactivation MAC CE for separate TCI states, wherein a maximum number of the TCI state IDs that are activated is 32, and wherein information associated with the enhanced unified TCI states activation/deactivation MAC CE for separate TCI states is indicated to lower layers.

18. The BS of claim 17, wherein:

the transceiver is further configured to transmit a second MAC PDU including a second MAC CE and a second MAC subheader with a second eLCID, a unified TCI states activation/deactivation MAC CE is identified based on the second eLCID, whether control resource set pool IDs (CORESET pool IDs) are configured for control resource sets is determined, and the unified TCI states activation/deactivation MAC CE including a CORESET pool ID is identified based on a determination that the CORESET pool IDs that are configured for the control resource sets.

19. The BS of claim 18, wherein:

the CORESET pool ID indicates that a TCI state ID field is dedicated to a control resource set configured by the CORESET pool ID; and the TCI state ID field indicates a mapping between activated TCI states and a code point of a DCI TCI.

20. The BS of claim 17, wherein:

the enhanced unified TCI states activation/deactivation MAC CE for the separate TCI states further includes at least one of a serving cell ID, a downlink bandwidth part ID (DL BWP ID), or an uplink BWP ID (UL BWP ID);

the serving cell ID is five bits long and indicates the serving cell for which the enhanced unified TCI states activation/deactivation MAC CE for separate TCI states applies;

the DL BWP ID and the UL BWP ID indicate a DL BWP and a UL BWP, respectively, for which the enhanced unified TCI states activation/deactivation MAC CE for separate TCI states applies as a codepoint of a DCI BWP indicator;

a DL BWP ID field is two bits long and a UL BWP ID field is two bits long;

a first value of the bit in the bitmap of TCI state ID presence indications indicates that the TCI state for the TRP associated with the codepoint is present; and a second value of the bit in the bitmap of TCI state ID presence indications indicates that the TCI state for the TRP associated with the codepoint is absent.

* * * * *